(12) United States Patent
Kontomaris et al.

(10) Patent No.: US 10,287,469 B2
(45) Date of Patent: May 14, 2019

(54) USE OF ALKYL PERFLUOROALKENE ETHERS AND MIXTURES THEREOF IN HIGH TEMPERATURE HEAT PUMPS

(71) Applicant: THE CHEMOURS COMPANY FC, LLC, Wilmington, DE (US)

(72) Inventors: Konstantinos Kontomaris, Wilmington, DE (US); Robert Daniel Lousenberg, Wilmington, DE (US); Joan Ellen Bartelt, Wilmington, DE (US)

(73) Assignee: THE CHEMOURS COMPANY FC, LLC, Wilmington, DE (US)

( * ) Notice: Subject to any disclaimer, the term of this patent is extended or adjusted under 35 U.S.C. 154(b) by 288 days.

(21) Appl. No.: 14/893,599

(22) PCT Filed: May 30, 2014

(86) PCT No.: PCT/US2014/040124
§ 371 (c)(1),
(2) Date: Nov. 24, 2015

(87) PCT Pub. No.: WO2014/197290
PCT Pub. Date: Dec. 11, 2014

(65) Prior Publication Data
US 2016/0137895 A1    May 19, 2016

Related U.S. Application Data

(60) Provisional application No. 61/830,922, filed on Jun. 4, 2013.

(51) Int. Cl.
*C09K 5/04* (2006.01)
*F25B 13/00* (2006.01)
(Continued)

(52) U.S. Cl.
CPC .............. *C09K 5/045* (2013.01); *F25B 7/00* (2013.01); *F25B 13/00* (2013.01); *F25B 30/02* (2013.01);
(Continued)

(58) Field of Classification Search
None
See application file for complete search history.

(56) References Cited

U.S. PATENT DOCUMENTS 4,926,650 A * 5/1990 Dawn .................... C09K 5/044
                                                          252/67
5,762,817 A * 6/1998 Merchant ................. C08J 9/149
                                                          134/2
(Continued)

FOREIGN PATENT DOCUMENTS

CN     102072559     5/2011
CN     102686957     9/2012
(Continued)

OTHER PUBLICATIONS

Office Action in Taiwanese Application No. 103117743, dated Dec. 18, 2017, 10 pages (with English translation).
(Continued)

*Primary Examiner* — Frantz Jules
*Assistant Examiner* — Steve Tanenbaum

(57) ABSTRACT

Disclosed herein is a method for producing heating in a high temperature heat pump having a heat exchanger. The method comprises extracting heat from a working fluid, thereby producing a cooled working fluid wherein said working fluid comprises at least one alkyl perfluoroalkene ether. Also disclosed is a method of raising the maximum feasible condenser operating temperature in a high temperature heat pump apparatus. The method comprises charging the high temperature heat pump with a working fluid comprising at (Continued)

least one alkyl perfluoroalkene ether. Also disclosed is a high temperature heat pump apparatus. The apparatus contains a working fluid comprising at least one alkyl perfluoroalkene ether. Also disclosed is a composition comprising at least one alkyl perfluoroalkene ether, and specialized additives or lubricants for use in a high temperature heat pump.

17 Claims, 3 Drawing Sheets

(51) Int. Cl.
    *F25B 7/00*     (2006.01)
    *F25B 30/02*     (2006.01)
    *F25B 9/00*     (2006.01)
    *F25B 31/00*     (2006.01)

(52) U.S. Cl.
    CPC .. *C09K 2205/112* (2013.01); *C09K 2205/126* (2013.01); *C09K 2205/24* (2013.01); *F25B 9/008* (2013.01); *F25B 31/002* (2013.01); *F25B 2309/061* (2013.01); *F25B 2400/121* (2013.01); *F25B 2500/16* (2013.01); *Y02B 30/52* (2013.01); *Y02P 20/124* (2015.11)

(56) References Cited

U.S. PATENT DOCUMENTS

| | | | |
|---|---|---|---|
| 8,399,713 | B2 | 3/2013 | Bartelt et al. |
| 2003/0042463 | A1 | 3/2003 | Arman et al. |
| 2010/0025619 | A1 | 2/2010 | Riva et al. |
| 2010/0209600 | A1 | 8/2010 | Bartelt et al. |
| 2012/0006510 | A1* | 1/2012 | Bartelt ............. C09K 5/10 165/104.11 |
| 2012/0157362 | A1 | 6/2012 | Knapp et al. |
| 2012/0157363 | A1 | 6/2012 | Knapp et al. |
| 2012/0227764 | A1 | 9/2012 | Bartelt et al. |

FOREIGN PATENT DOCUMENTS

| | | |
|---|---|---|
| FR | 2928648 A1 | 9/2009 |
| JP | 2013-100805 | 5/2013 |
| WO | WO 2011/056824 | 5/2011 |
| WO | WO 2013/040266 | 3/2013 |
| WO | WO 2013/045361 | 4/2013 |

OTHER PUBLICATIONS

Office Action in European Application No. 14732789.4, dated Oct. 10, 2017, 3 pages.
International Search Report, PCT/US2014/040124, dated Aug. 19, 2014.
Doherty et al., Conceptual Design of Distillation Systems, McGraw-Hill (New York), 2001, 185-136, 351-359.
Office Action in Chinese Application No. 201480038106.9, dated May 2, 2018, 15 pages (with English translation).
Office Action in Japanese Application No. 2016-518353, dated Apr. 24, 2018, 5 pages (with English translation).
Office Action in Australian Application No. 2017248525, dated Nov. 22, 2018, 5 pages.

* cited by examiner

US 10,287,469 B2

USE OF ALKYL PERFLUOROALKENE ETHERS AND MIXTURES THEREOF IN HIGH TEMPERATURE HEAT PUMPS

FIELD OF THE INVENTION

This invention relates to methods and systems having utility in numerous applications, and in particular, in high temperature heat pumps.

BACKGROUND OF THE INVENTION

Current trends shaping the global energy landscape suggest an expanding utilization of low temperature heat (i.e. heat at temperatures lower than about 250° C.) in the near future. Such heat may be recovered from various commercial or industrial operations, can be extracted from geothermal or hydrothermal reservoirs or can be generated through solar collectors. Motivation for low temperature heat utilization is provided by increasing energy prices and a growing awareness of the environmental impacts, in general, and the threat to the earth's climate, in particular, from the use of fossil fuels.

Elevation of the temperature of available heat through high temperature mechanical compression heat pumps (HTHPs) to meet heating requirements is one promising approach for the use of low temperature heat. Heat pumps operating according to a reverse Rankine cycle require the use of working fluids. Commercially available working fluids that are used or could be used for HTHPs (e.g. HFC-245fa, Vertrel® XF, HFC-365mfc) are coming under increasing scrutiny because of their relatively high Global Warming Potential (GWP). Clearly, there is an increasing need for more environmentally sustainable working fluids for HTHPs.

The use of zero-ODP, low GWP working fluids based on hydrofluoroolefins (HFOs) for high temperature heat pumps has been previously disclosed. However, the critical temperatures of previously disclosed HFO-based working fluids limit the maximum practical condensing temperatures that could be delivered by a heat pump operating according to the conventional reverse Rankine cycle to about 160° C.

The compositions of the present invention are part of a continued search for the next generation of low global warming potential materials. Such materials must have low environmental impact, as measured by low global warming potential and zero ozone depletion potential. New heat pump and high temperature heat pump working fluids are needed.

SUMMARY OF THE INVENTION

This invention discloses low GWP working fluids with critical temperatures sufficiently high to enable high temperature heat pumps to deliver condensing temperatures approaching or even exceeding 230° C.

Embodiments of the present invention involve alkyl perfluoroalkene ethers, either alone or in combination with one or more other compounds as described in detail herein below.

In accordance with this invention, a method for producing heating in a high temperature heat pump having a heat exchanger is provided. The method comprises extracting heat from a working fluid, thereby producing a cooled working fluid wherein said working fluid comprises at least one alkyl perfluoroalkene ether.

Also in accordance with this invention, a method of raising the condenser operating temperature in a high temperature heat pump apparatus is provided. The method comprises charging the high temperature heat pump with a working fluid comprising at least one alkyl perfluoroalkene ether.

Also in accordance with this invention, a high temperature heat pump apparatus is provided. The apparatus contains a working fluid comprising at least one alkyl perfluoroalkene ether.

Also in accordance with this invention, a composition for use in high temperature heat pumps is provided. The composition comprises (i) a working fluid consisting essentially of at least one alkyl perfluoroalkene ether; and (ii) a stabilizer to prevent degradation at temperatures of 55° C. or above; or (iii) a lubricant suitable for use at 55° C. or above, or both (ii) and (iii).

DETAILED DESCRIPTION OF PREFERRED EMBODIMENTS

Figure 1:
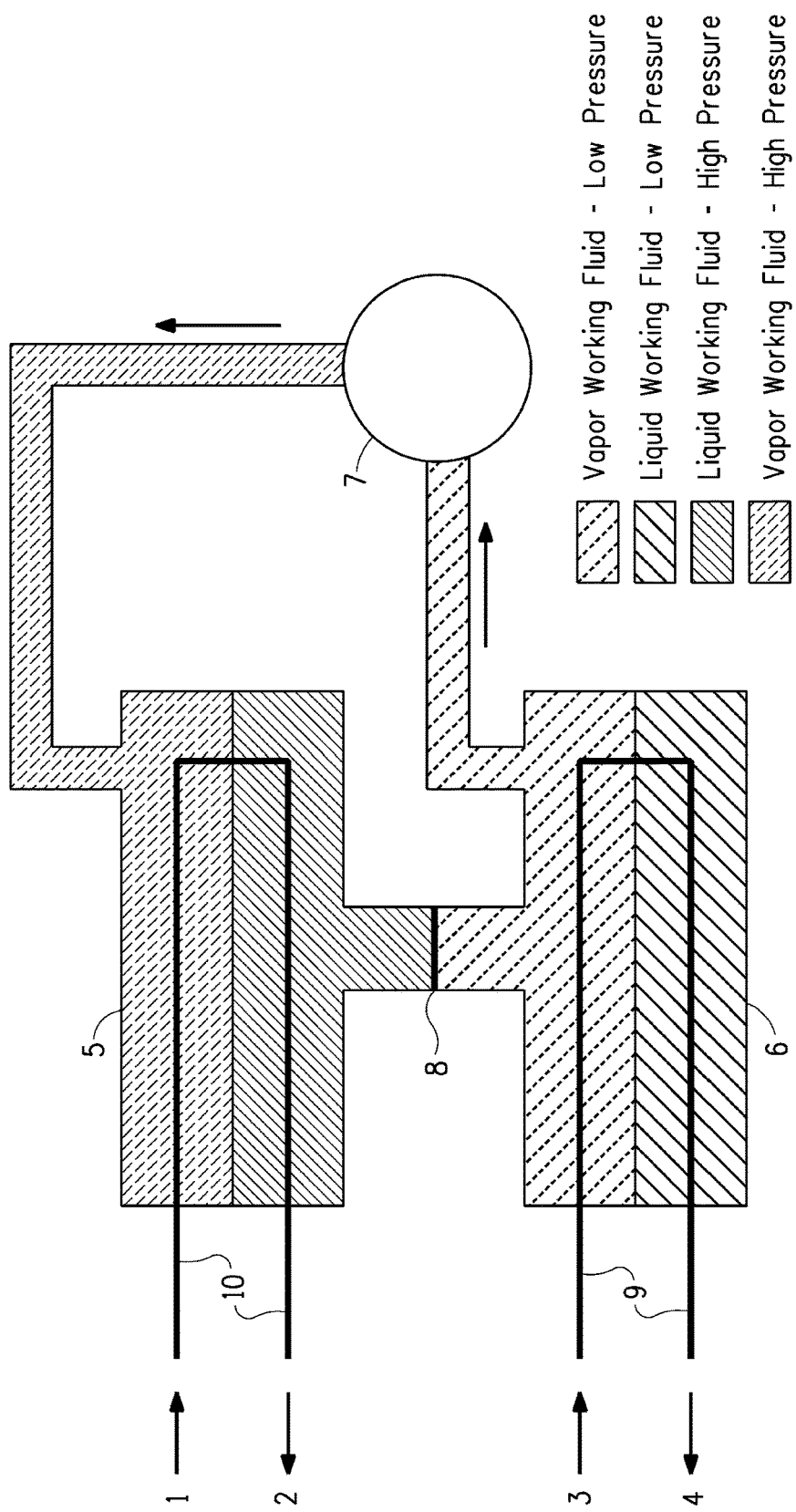
FIG. 1 is a schematic diagram of one embodiment of a flooded evaporator heat pump apparatus according to the present invention.

Before addressing details of embodiments described below, some terms are defined or clarified.

Global warming potential (GWP) is an index for estimating relative global warming contribution due to atmospheric emission of a kilogram of a particular greenhouse gas compared to emission of a kilogram of carbon dioxide. GWP can be calculated for different time horizons showing the effect of atmospheric lifetime for a given gas. The GWP for the 100 year time horizon is commonly the value referenced.

Ozone depletion potential (ODP) is defined in "The Scientific Assessment of Ozone Depletion, 2002, A report of the World Meteorological Association's Global Ozone Research and Monitoring Project," section 1.4.4, pages 1.28 to 1.31 (see first paragraph of this section). ODP represents the extent of ozone depletion in the stratosphere expected from a compound on a mass-for-mass basis relative to fluorotrichloromethane (CFC-11).

Refrigeration capacity (sometimes referred to as cooling capacity) is a term to define the change in enthalpy of a refrigerant or working fluid in an evaporator per unit mass of refrigerant or working fluid circulated. Volumetric cooling capacity refers to the amount of heat removed by the refrigerant or working fluid in the evaporator per unit volume of refrigerant vapor exiting the evaporator. The refrigeration capacity is a measure of the ability of a refrigerant, working fluid or heat transfer composition to produce cooling. Therefore, the higher the volumetric cooling capacity of the working fluid, the greater the cooling rate that can be produced at the evaporator with the maximum volumetric flow rate achievable with a given compressor. Cooling rate refers to the heat removed by the refrigerant in the evaporator per unit time.

Similarly, volumetric heating capacity is a term to define the amount of heat supplied by the refrigerant or working fluid in the condenser per unit volume of refrigerant or working fluid vapor entering the compressor. The higher the volumetric heating capacity of the refrigerant or working fluid, the greater the heating rate that is produced at the condenser with the maximum volumetric flow rate achievable with a given compressor.

Coefficient of performance (COP) is the amount of heat removed in the evaporator divided by the energy required to operate the compressor. The higher the COP, the higher the energy efficiency. COP is directly related to the energy efficiency ratio (EER), that is, the efficiency rating for refrigeration or air conditioning equipment at a specific set of internal and external temperatures.

As used herein, a heat transfer medium (also referred to herein as a heating medium) comprises a composition used to carry heat from a body to be cooled to the chiller evaporator or from the chiller condenser to a cooling tower or other configuration where heat can be rejected to the ambient.

As used herein, a working fluid comprises a compound or mixture of compounds that function to transfer heat in a cycle wherein the working fluid undergoes a phase change from a liquid to a gas and back to a liquid in a repeating cycle.

Subcooling is the reduction of the temperature of a liquid below that liquid's saturation point for a given pressure. The saturation point is the temperature at which a vapor composition is completely condensed to a liquid (also referred to as the bubble point). But subcooling continues to cool the liquid to a lower temperature liquid at the given pressure. By cooling a liquid below the saturation temperature, the net refrigeration capacity can be increased. Subcooling thereby improves refrigeration capacity and energy efficiency of a system. Subcool amount is the amount of cooling below the saturation temperature (in degrees) or how far below its saturation temperature a liquid composition is cooled.

Superheat is a term that defines how far above its saturation vapor temperature (the temperature at which, if the composition is cooled, the first drop of liquid is formed, also referred to as the "dew point") a vapor composition is heated.

Temperature glide (sometimes referred to simply as "glide") is the absolute value of the difference between the starting and ending temperatures of a phase-change process by a refrigerant within a component of a refrigerant system, exclusive of any subcooling or superheating. This term may be used to describe condensation or evaporation of a near azeotrope or non-azeotropic composition.

An azeotropic composition is a mixture of two or more different components which, when in liquid form under a given pressure, will boil at a substantially constant temperature, which temperature may be higher or lower than the boiling temperatures of the individual components, and which will provide a vapor composition essentially identical to the overall liquid composition undergoing boiling. (see, e.g., M. F. Doherty and M. F. Malone, Conceptual Design of Distillation Systems, McGraw-Hill (New York), 2001, 185-186, 351-359).

Accordingly, the essential features of an azeotropic composition are that at a given pressure, the boiling point of the liquid composition is fixed and that the composition of the vapor above the boiling composition is essentially that of the overall boiling liquid composition (i.e., no fractionation of the components of the liquid composition takes place). It is also recognized in the art that both the boiling point and the weight percentages of each component of the azeotropic composition may change when the azeotropic composition is subjected to boiling at different pressures. Thus, an azeotropic composition may be defined in terms of the unique relationship that exists among the components or in terms of the compositional ranges of the components or in terms of exact weight percentages of each component of the composition characterized by a fixed boiling point at a specified pressure.

For the purpose of this invention, an azeotrope-like (or near azeotropic) composition means a composition that behaves substantially like an azeotropic composition (i.e., has constant boiling characteristics or a tendency not to fractionate upon boiling or evaporation). Hence, during boiling or evaporation, the vapor and liquid compositions, if they change at all, change only to a minimal or negligible extent. This is to be contrasted with non-azeotrope-like compositions in which during boiling or evaporation, the vapor and liquid compositions change to a substantial degree.

As used herein, the terms "comprises," "comprising," "includes," "including," "has," "having" or any other variation thereof, are intended to cover a non-exclusive inclusion. For example, a composition, process, method, article, or apparatus that comprises a list of elements is not necessarily limited to only those elements but may include other elements not expressly listed or inherent to such composition, process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

The transitional phrase "consisting of" excludes any element, step, or ingredient not specified. If in the claim such would close the claim to the inclusion of materials other than those recited except for impurities ordinarily associated therewith. When the phrase "consists of" appears in a clause of the body of a claim, rather than immediately following the preamble, it limits only the element set forth in that clause; other elements are not excluded from the claim as a whole.

The transitional phrase "consisting essentially of" is used to define a composition, method or apparatus that includes materials, steps, features, components, or elements, in addition to those literally disclosed provided that these additional included materials, steps, features, components, or elements do materially affect the basic and novel characteristic(s) of the claimed invention. The term 'consisting essentially of' occupies a middle ground between "comprising" and 'consisting of'.

Where applicants have defined an invention or a portion thereof with an open-ended term such as "comprising," it should be readily understood that (unless otherwise stated) the description should be interpreted to also describe such an invention using the terms "consisting essentially of" or "consisting of."

Also, use of "a" or "an" are employed to describe elements and components described herein. This is done merely for convenience and to give a general sense of the scope of the invention. This description should be read to include one or at least one and the singular also includes the plural unless it is obvious that it is meant otherwise.

Unless otherwise defined, all technical and scientific terms used herein have the same meaning as commonly understood by one of ordinary skill in the art to which this invention belongs. Although methods and materials similar or equivalent to those described herein can be used in the practice or testing of embodiments of the present invention, suitable methods and materials are described below. All publications, patent applications, patents, and other references mentioned herein are incorporated by reference in their entirety, unless a particular passage is cited. In case of conflict, the present specification, including definitions, will control. In addition, the materials, methods, and examples are illustrative only and not intended to be limiting.

The alkyl perfluoroalkene ether working fluids disclosed herein for use in the method to produce heating may be prepared by contacting a perfluoroalkene, such as perfluoro-3-heptene, pefluoro-2-heptene, perfluoro-2-hexene, perfluoro-3-hexene, or perfluoro-2-pentene with an alcohol in the presence of a strong base optionally in the presence of a phase transfer catalyst, as described in detail in U.S. Pat. No. 8,399,713. For example, perfluoro-3-heptene may be reacted with an alcohol such as methanol or ethanol, or mixtures thereof, in the presence of an aqueous solution of a strong base to produce unsaturated fluoroethers.

In one embodiment, the products from the reaction of perfluoro-3-heptene with methanol comprise 5-methoxyperfluoro-3-heptene, 3-methoxyperfluoro-3-heptene, 4-methoxyperfluoro-2-heptene and 3-methoxyperfluoro-2-heptene.

In one embodiment, the products from the reaction of perfluoro-2-pentene with methanol comprise 4-methoxyperfluoro-2-pentene, 2-methoxyperfluoro-2-pentene, 3-methoxyperfluoro-2-pentene, and 2-methoxyperfluoro-3-pentene.

In one embodiment, the products from the reaction of perfluoro-2-octene with methanol comprise cis- and trans-2-methoxyperfluoro-2-octene and 2-methoxyperfluoro-3-octene.

High Temperature Heat Pump Methods

In accordance with this invention, a method is provided for producing heating in a high temperature heat pump having a condenser wherein a vapor working fluid is condensed to heat a heat transfer medium and the heated heat transfer medium is transported out of the condenser to a body to be heated. The method comprises condensing a vapor working fluid in a condenser, thereby producing a liquid working fluid wherein said vapor and liquid working fluid comprises at least one alkyl perfluoroalkene ether.

In one embodiment is provided a method for producing heating in a high temperature heat pump comprising extracting heat from a working fluid, thereby producing a cooled working fluid wherein said working fluid comprises at least one alkyl perfluoroalkene ether. Of note are methods wherein the working fluid consists essentially of at least one alkyl perfluoroalkene ether. Also of note are methods wherein the working fluid consists of at least one alkyl perfluoroalkene ether.

In one embodiment, the method for producing heating uses a working fluid comprising at least one alkyl perfluoroalkene ether.

In one embodiment, the working fluid comprises at least one alkyl perfluoroalkene ether selected from the group consisting of:
 a) compounds of formula $CF_3(CF_2)_xCF\!\!=\!\!CFCF(OR)(CF_2)_yCF_3$, $CF_3(CF_2)_xC(OR)\!\!=\!\!CFCF_2(CF_2)_yCF_3$, $CF_3CF\!\!=\!\!CFCF(OR)(CF_2)_x(CF_2)_yCF_3$, $CF_3(CF_2)_xCF\!\!=\!\!C(OR)CF_2(CF_2)_yCF_3$, or mixtures thereof, wherein R can be either $CH_3$, $C_2H_5$ or mixtures thereof, and wherein x and y are independently 0, 1, 2 or 3, and wherein x+y=0, 1, 2 or 3 having the formula;
 b) compounds of formulas $CF_3(CF_2)_xCF\!\!=\!\!CFCF(OR)(CF_2)_yCF_3$, $CF_3(CF_2)_xC(OR)\!\!=\!\!CFCF_2(CF_2)_yCF_3$, $CF_3CF\!\!=\!\!CFCF(OR)(CF_2)_x(CF_2)_yCF_3$, $CF_3(CF_2)_xCF\!\!=\!\!C(OR)CF_2(CF_2)_yCF_3$, and mixtures thereof; wherein x and y are independently 0, 1, 2 or 3 or 4 and wherein x+y=0, 1, 2, 3 or 4; and wherein R is 2,2,3,3-tetrafluoro-1-propyl, 2,2,3,3,3-pentafluoro-1-propyl, 2,2,2-trifluoro-1-ethyl, 2,2,3,3,4,4,5,5-octafluoro-1-pentyl, or 1,1,1,3,3,3-hexafluoro-2-propyl; and
 c) mixtures of compounds from (a) and (b).

In one embodiment of the method for producing heating, the alkyl perfluoroalkene ethers comprise 5-methoxyperfluoro-3-heptene, 3-methoxyperfluoro-3-heptene, 4-methoxyperfluoro-2-heptene, 3-methoxyperfluoro-2-heptene, and mixtures thereof.

In one embodiment of the method for producing heating, the alkyl perfluoroalkene ethers comprise 4-methoxyperfluoro-2-pentene, 2-methoxyperfluoro-2-pentene, 3-methoxyperfluoro-2-pentene, 2-methoxyperfluoro-3-pentene, and mixtures thereof.

In one embodiment of the method for producing heating, the alkyl perfluoroalkene ethers comprise cis- and trans-2-methoxyperfluoro-2-octene, 2-methoxyperfluoro-3-octene, and mixtures thereof.

In one embodiment of the method for producing heating, the working fluid further comprises at least one compound selected from hydrofluorocarbons, hydrochlorocarbons, hydrofluoroethers, hydrofluoroolefins, hydrochlorofluoroolefins, siloxanes, hydrocarbons, alcohols, perfluoropolyethers, and mixtures thereof.

In one embodiment of the method for producing heating, the working fluid comprises azeotropic or near-azeotropic mixtures. In one embodiment, the azeotropic or near azeotropic mixture comprises at least one methyl perfluoroheptene ether and at least one compound selected from the group consisting of heptane, ethanol, and trans-1,2-dichloroethene. In another embodiment, the azeotropic or near azeotropic mixture comprises at least one methyl perfluoropentene ether and at least one compound selected from the group consisting of trans-1,2-dichloroethene, methanol, ethanol, 2-propanol, cyclopentane, ethyl formate, methyl formate, and 1-bromopropane.

In yet another embodiment of the method for producing heating, the working fluid comprises at least one alkyl perfluoroalkene ether and optionally one or more fluids selected from the group consisting of HFC-161, HFC-32, HFC-125, HFC-143a, HFC-245cb, HFC-134a, HFC-134, HFC-227ea, HFC-236ea, HFC-245fa, HFC-245eb, HFC-365mfc, HFC-4310mee, HFO-1234yf, HFO-1234ze-E, HFO-1234ze-Z, HFO-1336mzz-E, HFO-1336mzz-Z, HFO-1234ye-E or Z (1,2,3,3-tetrafluoropropene), HFO-1438mzz-E, HFO-1438mzz-Z, HFO-1438ezy-E, HFO-1438ezy-Z, HFO-1336yf, HFO-1336ze-E, HFO-1336ze-Z, HCFO-1233zd-E, HCFO-1233zd-Z, HCFO-1233xf, HFE-7000 (also known as HFE-347mcc or n-$C_3F_7OCH_3$), HFE-7100 (also known as HFE-449mccc or $C_4F_9OCH_3$), HFE-7200 (also known as HFE-569mccc or $C_4F_9OC_2H_5$), HFE-7500 (also known as 3-ethoxy-1,1,1,2,3,4,4,5,5,6,6,6-dodecafluoro-2-trifluoromethyl-hexane or $(CF_3)_2CFCF(OC_2H_5)CF_2CF_2CF_3$), 1,1,1,2,2,4,5,5,5-nonafluoro-4-(trifluoromethyl)-3-pentanone (sold under the trademark Novec™ 1230 by 3M, St. Paul, Minn., USA), octamethylcyclotetrasiloxane, decamethylcyclopentasiloxane, octamethyltrisiloxane (OMTS), hexamethyldisiloxane (HMDS), n-pentane, isopentane, cyclopentane, hexanes, cyclohexane, heptanes, and toluene.

Also of particular utility in the method for producing heating are those embodiments wherein the working fluid has a low GWP.

In one embodiment of the method for producing heating, the heat exchanger is selected from the group consisting of a supercritical working fluid cooler and a condenser.

In some embodiments of the method for producing heating, the high temperature heat pump operates at heat exchanger temperatures greater than about 55° C. In another embodiment, the high temperature heat pump operates at heat exchanger temperatures greater than about 60° C. In another embodiment, the high temperature heat pump operates at heat exchanger temperatures greater than about 65° C. In another embodiment, the high temperature heat pump operates at heat exchanger temperatures greater than about 75° C. In another embodiment, the high temperature heat pump operates at heat exchanger temperatures greater than about 100° C. In another embodiment, the high temperature heat pump operates at heat exchanger operating temperatures greater than about 120° C.

In some embodiments of the method for producing heating, the high temperature heat pump operates at condenser or supercritical working fluid cooler temperatures greater than about 55° C. In another embodiment, the high temperature heat pump operates at condenser or supercritical working fluid cooler temperatures greater than about 60° C. In another embodiment, the high temperature heat pump operates at condenser or supercritical working fluid cooler temperatures greater than about 65° C. In another embodiment, the high temperature heat pump operates at condenser or supercritical working fluid cooler temperatures greater than about 75° C. In another embodiment, the high temperature heat pump operates at condenser or supercritical working fluid cooler temperatures greater than about 100° C. In another embodiment, the high temperature heat pump operates at condenser or supercritical working fluid cooler operating temperatures greater than about 120° C.

In one embodiment of the method for producing heating, the method further comprises passing a first heat transfer medium through the heat exchanger, whereby said extraction of heat heats the first heat transfer medium, and passing the heated first heat transfer medium from the heat exchanger to a body to be heated.

A body to be heated may be any space, object or fluid that may be heated. In one embodiment, a body to be heated may be a room, building, or the passenger compartment of an automobile. Alternatively, in another embodiment, a body to be heated may be a heat transfer medium or heat transfer fluid.

In one embodiment of the method for producing heating, the first heat transfer medium is water and the body to be heated is water. In another embodiment, the first heat transfer medium is water and the body to be heated is air for space heating. In another embodiment, the first heat transfer medium is an industrial heat transfer liquid and the body to be heated is a chemical process stream.

In another embodiment of the method for producing heating, the method to produce heating further comprises compressing the working fluid in a dynamic (e.g. axial or centrifugal) compressor or a positive displacement (e.g., reciprocating, screw or scroll) compressor. In another embodiment, the dynamic compressor is a centrifugal compressor. In another embodiment, the dynamic compressor is a screw compressor. In another embodiment, the dynamic compressor is a scroll compressor.

In another embodiment of the method for producing heating, the method to produce heating further comprises compressing the working fluid vapor in a centrifugal compressor.

In one embodiment of the method for producing heating, the heating is produced in a heat pump having a condenser comprising passing a heat transfer medium to be heated through said condenser, thus heating the heat transfer medium. In one embodiment, the heat transfer medium is air, and the heated air from the condenser is passed to a space to be heated. In another embodiment, the heat transfer medium is a portion of a process stream, and the heated portion is returned to the process.

In some embodiments of the method for producing heating, the heat transfer medium (or heating medium) may be selected from water or glycol (such as ethylene glycol or propylene glycol). Of particular note is an embodiment wherein the first heat transfer medium is water and the body to be cooled is air for space cooling.

In another embodiment of the method for producing heating, the heat transfer medium may be an industrial heat transfer liquid, wherein the body to be heated is a chemical process stream, which includes process lines and process equipment such as distillation columns. Of note are industrial heat transfer liquids including ionic liquids, various brines such as aqueous calcium or sodium chloride, glycols such as propylene glycol or ethylene glycol, methanol, and other heat transfer media such as those listed in Chapter 4 of the 2006 ASHRAE Handbook on Refrigeration.

In one embodiment, the method for producing heating comprises extracting heat in a flooded evaporator high temperature heat pump as described above with respect to FIG. 1. In this method, the liquid working fluid is evaporated to form a working fluid vapor in the vicinity of a first heat transfer medium. The first heat transfer medium is a warm liquid, such as water, which is transported into the evaporator via a pipe from a low temperature heat source. The warm liquid is cooled and is returned to the low temperature heat source or is passed to a body to be cooled, such as a building. The working fluid vapor is then condensed in the vicinity of a second heat transfer medium, which is a chilled liquid which is brought in from the vicinity of a body to be heated (heat sink). The second heat transfer medium cools the working fluid such that it is condensed to form a liquid working fluid. In this method a flooded evaporator heat pump may also be used to heat domestic or service water or a process stream.

In another embodiment, the method for producing heating comprises producing heating in a direct expansion high temperature heat pump as described above with respect to FIG. 2. In this method, the liquid working fluid is passed through an evaporator and evaporates to produce a working fluid vapor. A first liquid heat transfer medium is cooled by the evaporating working fluid. The first liquid heat transfer medium is passed out of the evaporator to a low temperature heat source or a body to be cooled. The working fluid vapor is then condensed in the vicinity of a second heat transfer medium, which is a chilled liquid which is brought in from the vicinity of a body to be heated (heat sink). The second heat transfer medium cools the working fluid such that it is condensed to form a liquid working fluid. In this method, a direct expansion heat pump may also be used to heat domestic or service water or a process stream.

In one embodiment of the method for producing heating, the high temperature heat pump includes a compressor which is a centrifugal compressor.

In one embodiment of the method for producing heat, heat is exchanged between at least two heating stages, the method comprises absorbing heat in a working fluid in a heating stage operated at a selected condensing temperature and transferring this heat to the working fluid of another heating stage operated at a higher condensing temperature; wherein the working fluid of the heating stage operated at the higher condensing temperature comprises at least one alkyl perfluoroalkene ether.

In one embodiment, a method for producing heating in a high temperature heat pump is provided, wherein heat is exchanged between at least two stages arranged in a cascade configuration, comprising absorbing heat at a selected lower temperature in a first working fluid in a first cascade stage and transferring this heat to a second working fluid of a second cascade stage that supplies heat at a higher temperature; wherein the second working fluid comprises at least one alkyl perfluoroalkene ether. In another embodiment, the heat supplied in the second cascade stage is at a temperature of at least 150° C.

In another embodiment of the invention is disclosed a method of raising the condenser operating temperature in a high temperature heat pump apparatus comprising charging the high temperature heat pump with a working fluid comprising at least one alkyl perfluoroalkene ether.

Use of alkyl perfluoroalkene ethers in high temperature heat pumps increases the capability of these heat pumps because it allows operation at condenser temperatures higher than achievable with working fluids used in similar systems today.

In one embodiment, the method of raising the condenser operating temperature in a high temperature heat pump apparatus uses a working fluid comprising at least one alkyl perfluoroalkene ether.

In one embodiment of the method of raising the condenser operating temperature, the working fluid comprises at least one alkyl perfluoroalkene ether selected from the group consisting of:

a) compounds of formula $CF_3(CF_2)_xCF\!\!=\!\!CFCF(OR)(CF_2)_yCF_3$, $CF_3(CF_2)_xC(OR)\!\!=\!\!CFCF_2(CF_2)_yCF_3$, $CF_3CF\!\!=\!\!CFCF(OR)(CF_2)_x(CF_2)_yCF_3$, $CF_3(CF_2)_xCF\!\!=\!\!C(OR)CF_2(CF_2)_yCF_3$, or mixtures thereof, wherein R can be either $CH_3$, $C_2H_5$ or mixtures thereof, and wherein x and y are independently 0, 1, 2 or 3, and wherein x+y=0, 1, 2 or 3 having the formula;

b) compounds of formulas $CF_3(CF_2)_xCF\!\!=\!\!CFCF(OR)(CF_2)_yCF_3$, $CF_3(CF_2)_xC(OR)\!\!=\!\!CFCF_2(CF_2)_yCF_3$, $CF_3CF\!\!=\!\!CFCF(OR)(CF_2)_x(CF_2)_yCF_3$, $CF_3(CF_2)_xCF\!\!=\!\!C(OR)CF_2(CF_2)_yCF_3$, and mixtures thereof; wherein x and y are independently 0, 1, 2, 3 or 4 and wherein x+y=0, 1, 2, 3 or 4; and wherein R is 2,2,3,3-tetrafluoro-1-propyl, 2,2,3,3,3-pentafluoro-1-propyl, 2,2,2-trifluoro-1-ethyl, 2,2,3,3,4,4,5,5-octafluoro-1-pentyl, or 1,1,1,3,3,3-hexafluoro-2-propyl; and c) mixtures of compounds from (a) and (b).

In one embodiment of the method of raising the maximum feasible condenser operating temperature, the alkyl perfluoroalkene ethers comprise at least one of 5-methoxyperfluoro-3-heptene, 3-methoxyperfluoro-3-heptene, 4-methoxyperfluoro-2-heptene, 3-methoxyperfluoro-2-heptene, or mixtures thereof.

In one embodiment of the method of raising the condenser operating temperature, the alkyl perfluoroalkene ethers comprise at least one of 4-methoxyperfluoro-2-pentene, 2-methoxyperfluoro-2-pentene, 3-methoxyperfluoro-2-pentene, 2-methoxyperfluoro-3-pentene, or mixtures thereof.

In one embodiment of the method of raising the condenser operating temperature, the alkyl perfluoroalkene ethers comprise at least one of cis- and trans-2-methoxyperfluoro-2-octene, 2-methoxyperfluoro-3-octene, or mixtures thereof.

In one embodiment of the method of raising the condenser operating temperature, the working fluid further comprises at least one compound selected from hydrofluorocarbons, hydrochlorocarbons, hydrofluoroethers, hydrofluoroolefins, hydrochlorofluoroolefins, siloxanes, hydrocarbons, alcohols, perfluoropolyethers, and mixtures thereof.

In one embodiment of the method of raising the condenser operating temperature, the working fluid comprises azeotropic or near-azeotropic mixtures. In one embodiment, the azeotropic or near azeotropic mixture comprises at least one methyl perfluoroheptene ether and at least one compound selected from the group consisting of heptane, ethanol, and trans-1,2-dichloroethene as disclosed in. In another embodiment, the azeotropic or near azeotropic mixture comprises at least one methyl perfluoropentene ether and at least one compound selected from the group consisting of trans-1,2-dichloroethene, methanol, ethanol, 2-propanol, cyclopentane, ethyl formate, methyl formate, and 1-bromopropane.

In yet another embodiment of the method of raising the condenser operating temperature, the working fluid comprises at least one alkyl perfluoroalkene ether and optionally one or more fluids selected from the group consisting of HFC-161, HFC-32, HFC-125, HFC-143a, HFC-245cb, HFC-134a, HFC-134, HFC-227ea, HFC-236ea, HFC-245fa, HFC-245eb, HFC-365mfc, HFC-4310mee, HFO-1234yf, HFO-1234ze-E, HFO-1234ze-Z, HFO-1336mzz-E, HFO-1336mzz-Z, HFO-1234ye-E or Z (1,2,3,3-tetrafluoropropene), HFO-1438mzz-E, HFO-1438mzz-Z, HFO-1438ezy-E, HFO-1438ezy-Z, HFO-1336yf, HFO-1336ze-E, HFO-1336ze-Z, HCFO-1233zd-E, HCFO-1233zd-Z, HCFO-1233xf, HFE-7000 (also known as HFE-347mcc or n-$C_3F_7OCH_3$), HFE-7100 (also known as HFE-449mccc or $C_4F_9OCH_3$), HFE-7200 (also known as HFE-569mccc or $C_4F_9OC_2H_5$), HFE-7500 (also known as 3-ethoxy-1,1,1,2,3,4,4,5,5,6,6,6-dodecafluoro-2-trifluoromethyl-hexane or $(CF_3)_2CFCF(OC_2H_5)CF_2CF_2CF_3)$, 1,1,1,2,2,4,5,5,5-nonafluoro-4-(trifluoromethyl)-3-pentanone (sold under the trademark Novec™ 1230 by 3M, St. Paul, Minn., USA), octamethylcyclotetrasiloxane, decamethylcyclopentasiloxane, octamethyltrisiloxane (OMTS), hexamethyldisiloxane (HMDS), n-pentane, isopentane, cyclopentane, hexanes, cyclohexane, heptanes, and toluene.

Also of particular utility in the method of raising the condenser operating temperature are those embodiments wherein the working fluid has a low GWP.

When CFC-114 is used as the working fluid in a high temperature heat pump, the maximum practical condenser operating temperature is about 135° C. When HFC-245fa is used as the working fluid in a high temperature heat pump, the maximum practical condenser operating temperature is about 144° C. In one embodiment of the method to raise the condenser operating temperature, when a composition comprising at least one alkyl perfluoroalkene ether is used as the heat pump working fluid, the condenser operating temperature is raised to a temperature greater than about 150° C.

In another embodiment of the method to raise the condenser operating temperature, when a composition comprising at least one alkyl perfluoroalkene ether, is used as the heat pump working fluid, the condenser operating temperature is raised to a temperature greater than about 160° C. In another embodiment of the method to raise the condenser operating temperature, when a composition comprising at least one alkyl perfluoroalkene ether, is used as the heat pump working fluid, the condenser operating temperature is raised to a temperature greater than about 170° C. In another embodiment of the method to raise the condenser operating temperature, when a composition comprising at least one alkyl perfluoroalkene ether, is used as the heat pump working fluid, the condenser operating temperature is raised to a temperature greater than about 180° C. In another embodiment of the method to raise the condenser operating temperature, when a composition comprising at least one alkyl perfluoroalkene ether, is used as the heat pump working fluid, the condenser operating temperature is raised to a temperature greater than about 190° C. In another embodiment of the method to raise the condenser operating temperature, when a composition comprising at least one alkyl perfluoroalkene ether, is used as the heat pump working fluid, the condenser operating temperature is raised to a temperature greater than about 200° C. In another embodiment of the method to raise the condenser operating temperature, when a composition comprising at least one alkyl perfluoroalkene ether, is used as the heat pump working fluid, the condenser operating temperature is raised to a temperature greater than about 210° C. In another embodiment of the method to raise the condenser operating temperature, when a composition comprising at least one alkyl perfluoroalkene ether, is used as the heat pump working fluid, the condenser operating temperature is raised to a temperature greater than about 220° C. In another embodiment of the method to raise the condenser operating temperature, when a composition comprising at least one alkyl perfluoroalkene ether, is used as the heat pump working fluid, the condenser operating temperature is raised to a temperature greater than about 230° C.

It may be feasible that temperatures as high as 230° C. are achievable with a high temperature heat pump utilizing at least one alkyl perfluoroalkene ether as working fluid. However at temperatures above 120° C., some modification of compressor, or compressor materials, may be necessary.

In accordance with this invention it is also possible to use a working fluid comprising at least one alkyl perfluoroalkene ether in a system originally designed as a chiller using a conventional chiller working fluid (for example a chiller using HFC-134a or HCFC-123 or HFC-245fa) for the purpose of converting the system to a high temperature heat pump system. For example, a conventional chiller working fluid can be replaced in an existing chiller system with a working fluid comprising at least one alkyl perfluoroalkene ether to achieve this purpose.

In accordance with this invention it is also possible to use a working fluid comprising at least one alkyl perfluoroalkene ether in a system originally designed as a comfort (i.e., low temperature) heat pump system using a conventional comfort heat pump working fluid (for example a heat pump using HFC-134a or HCFC-123 or HFC-245fa) for the purpose of converting the system to a high temperature heat pump system. For example, a conventional comfort heat pump working fluid can be replaced in an existing comfort heat pump system with a working fluid comprising at least one alkyl perfluoroalkene ether to achieve this purpose.

A composition comprising at least one alkyl perfluoroalkene ether enables the design and operation of dynamic (e.g. centrifugal) or positive displacement (e.g. screw or scroll) heat pumps for upgrading heat available at low temperatures to meet demands for heating at higher temperatures. The available low temperature heat is supplied to the evaporator and the high temperature heat is extracted at the condenser. For example, waste heat can be available to be supplied to the evaporator of a heat pump operating at 100° C. at a location (e.g. an industrial facility) where heat from the condenser, operating at 140° C., can be used for a drying operation.

In some cases heat may be available from various other sources (e.g. waste heat from process streams, geothermal heat or solar heat) at temperatures higher than suggested above, while heating at even higher temperatures may be required. For example, waste heat or geothermal heat may be available at 125° C. while heating at 175° C. may be required for an industrial application (e.g. generation of high temperature steam). The lower temperature heat can be supplied to the evaporator of a dynamic (e.g. centrifugal) or positive displacement heat pump in the method or system of this invention to be uplifted to the desired temperature of 175° C. and be delivered at the condenser.

High Temperature Heat Pump Apparatus

In one embodiment of the present invention is provided a high temperature heat pump apparatus containing a working fluid comprising at least one alkyl perfluoroalkene ether.

In one embodiment of the high temperature heat pump apparatus, the working fluid comprises at least one alkyl perfluoroalkene ether selected from the group consisting of:
a) compounds of formula $CF_3(CF_2)_xCF=CFCF(OR)(CF_2)_yCF_3$, $CF_3(CF_2)_xC(OR)=CFCF_2(CF_2)_yCF_3$, $CF_3CF=CFCF(OR)(CF_2)_x(CF_2)_yCF_3$, $CF_3(CF_2)_xCF=C(OR)CF_2(CF_2)_yCF_3$, or mixtures thereof, wherein R can be either $CH_3$, $C_2H_5$ or mixtures thereof, and wherein x and y are independently 0, 1, 2 or 3, and wherein x+y=0, 1, 2 or 3 having the formula;
b) compounds of formulas $CF_3(CF_2)_xCF=CFCF(OR)(CF_2)_yCF_3$, $CF_3(CF_2)_xC(OR)=CFCF_2(CF_2)_yCF_3$, $CF_3CF=CFCF(OR)(CF_2)_x(CF_2)_yCF_3$, $CF_3(CF_2)_xCF=C(OR)CF_2(CF_2)_yCF_3$, and mixtures thereof; wherein x and y are independently 0, 1, 2, 3 or 4 and wherein x+y=0, 1, 2, 3 or 4; and wherein R is 2,2,3,3-tetrafluoro-1-propyl, 2,2,3,3,3-pentafluoro-1-propyl, 2,2,2-trifluoro-1-ethyl, 2,2,3,3,4,4,5,5-octafluoro-1-pentyl, or 1,1,1,3,3,3-hexafluoro-2-propyl; and
c) mixtures of compounds from (a) and (b).

In one embodiment of the high temperature heat pump apparatus, the alkyl perfluoroalkene ethers comprise at least one of 5-methoxyperfluoro-3-heptene, 3-methoxyperfluoro-3-heptene, 4-methoxyperfluoro-2-heptene, 3-methoxyperfluoro-2-heptene, or mixtures thereof.

In one embodiment of the high temperature heat pump apparatus, the alkyl perfluoroalkene ethers comprise at least one of 4-methoxyperfluoro-2-pentene, 2-methoxyperfluoro-2-pentene, 3-methoxyperfluoro-2-pentene, 2-methoxyperfluoro-3-pentene, or mixtures thereof.

In one embodiment of the high temperature heat pump apparatus, the alkyl perfluoroalkene ethers comprise at least one of cis- and trans-2-methoxyperfluoro-2-octene, 2-methoxyperfluoro-3-octene, or mixtures thereof.

In one embodiment of the high temperature heat pump apparatus, the working fluid further comprises at least one compound selected from hydrofluorocarbons, hydrochlorocarbons, hydrofluoroethers, hydrofluoroolefins, hydrochlorofluoroolefins, siloxanes, hydrocarbons, alcohols, perfluoropolyethers, and mixtures thereof.

In one embodiment of the high temperature heat pump apparatus, the working fluid comprises azeotropic or near-azeotropic mixtures. In one embodiment, the azeotropic or near azeotropic mixture comprises at least one methyl perfluoroheptene ether and at least one compound selected from the group consisting of heptane, ethanol, and trans-1,2-dichloroethene as disclosed in.

In another embodiment, the azeotropic or near azeotropic mixture comprises at least one methyl perfluoropentene ether and at least one compound selected from the group consisting of trans-1,2-dichloroethene, methanol, ethanol, 2-propanol, cyclopentane, ethyl formate, methyl formate, and 1-bromopropane.

In yet another embodiment of the high temperature heat pump apparatus, the working fluid comprises at least one alkyl perfluoroalkene ether and optionally one or more fluids selected from the group consisting of HFC-161, HFC-32, HFC-125, HFC-143a, HFC-245cb, HFC-134a, HFC-134, HFC-227ea, HFC-236ea, HFC-245fa, HFC-245eb, HFC-365mfc, HFC-4310mee, HFO-1234yf, HFO-1234ze-E, HFO-1234ze-Z, HFO-1336mzz-E, HFO-1336mzz-Z, HFO-1234ye-E or Z (1,2,3,3-tetrafluoropropene), HFO-1438mzz-E, HFO-1438mzz-Z, HFO-1438ezy-E, HFO-1438ezy-Z, HFO-1336yf, HFO-1336ze-E, HFO-1336ze-Z, HCFO-1233zd-E, HCFO-1233zd-Z, HCFO-1233xf, HFE-7000 (also known as HFE-347mcc or n-$C_3F_7OCH_3$), HFE-7100 (also known as HFE-449mccc or $C_4F_9OCH_3$), HFE-7200 (also known as HFE-569mccc or $C_4F_9OC_2H_5$), HFE-7500 (also known as 3-ethoxy-1,1,1,2,3,4,4,5,5,6,6,6-dodecafluoro-2-trifluoromethyl-hexane or $(CF_3)_2CFCF(OC_2H_5)CF_2CF_2CF_3$), 1,1,1,2,2,4,5,5,5-nonafluoro-4-(trifluoromethyl)-3-pentanone (sold under the trademark Novec™ 1230 by 3M, St. Paul, Minn., USA), octamethylcyclotetrasiloxane, decamethylcyclopentasiloxane, octamethyltrisiloxane (OMTS), hexamethyldisiloxane (HMDS), n-pentane, isopentane, cyclopentane, hexanes, cyclohexane, heptanes, and toluene.

A heat pump is a type of apparatus for producing heating and/or cooling. A heat pump includes an evaporator, a compressor, a condenser or supercritical working fluid cooler, and an expansion device. A working fluid circulates through these components in a repeating cycle. Heating is produced at the condenser where energy (in the form of heat) is extracted from the vapor working fluid as it is condensed to form liquid working fluid. Cooling is produced at the evaporator where energy is absorbed to evaporate the working fluid to form vapor working fluid.

In one embodiment, the high temperature heat pump apparatus of the present invention comprises (a) an evaporator through which a working fluid flows and is evaporated; (b) a compressor in fluid communication with the evaporator that compresses the evaporated working fluid to a higher pressure; (c) a condenser in fluid communication with the compressor through which the high pressure working fluid vapor flows and is condensed; and (d) a pressure reduction device in fluid communication with the condenser wherein the pressure of the condensed working fluid is reduced and said pressure reduction device further being in fluid communication with the evaporator such that the working fluid then repeats flow through components (a), (b), (c) and (d) in a repeating cycle.

In one embodiment, the high temperature heat pump apparatus uses a working fluid comprising at least one alkyl perfluoroalkene ether. Of note are working fluids that consist essentially of at least one alkyl perfluoroalkene ether.

Of particular utility in the high temperature heat pump apparatus are those embodiments wherein the working fluid consists essentially of at least one alkyl perfluoroalkene ether. Also of particular utility are those embodiments wherein the working fluid comprises an azeotropic or near azeotropic composition.

Also of particular utility in the high temperature heat pump apparatus are those embodiments wherein the working fluid has a low GWP.

Figure 2:
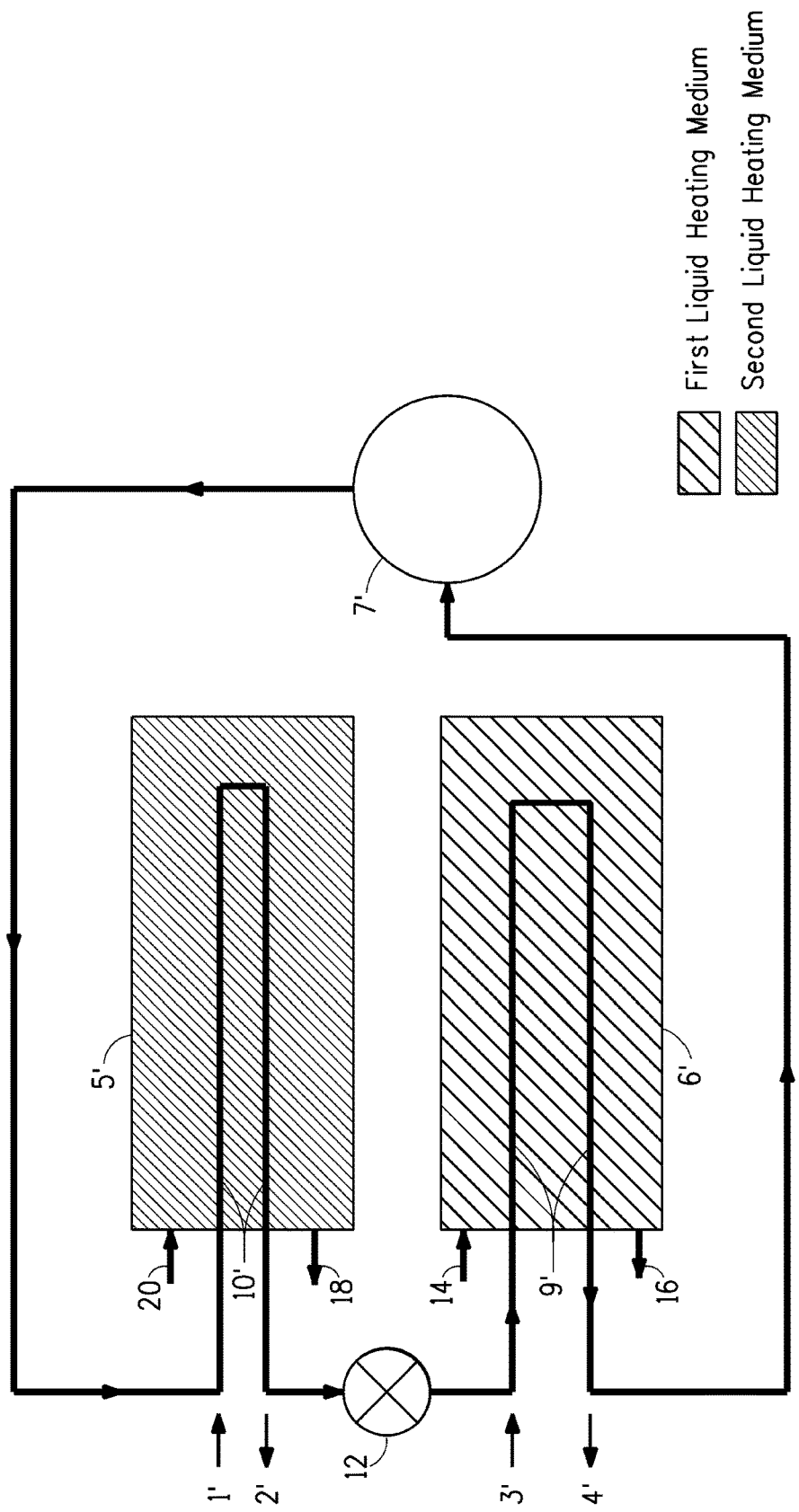
FIG. 2 is a schematic diagram of one embodiment of a direct expansion heat pump apparatus according to the present invention.

Heat pumps may include flooded evaporators one embodiment of which is shown in FIG. 1, or direct expansion evaporators one embodiment of which is shown in FIG. 2.

Heat pumps may utilize positive displacement compressors or centrifugal compressors. Positive displacement compressors include reciprocating, screw, or scroll compressors. Of note are heat pumps that use screw compressors. Also of note are heat pumps that use centrifugal compressors.

Residential heat pumps are used to produce heated air to warm a residence or home (including single family or multi-unit attached homes) and produce maximum condenser operating temperatures from about 30° C. to about 50° C.

Of note are high temperature heat pumps that may be used to heat air, water, another heat transfer medium or some portion of an industrial process, such as a piece of equipment, storage area or process stream. In one embodiment, high temperature heat pumps can produce condenser operating temperatures greater than about 55° C. In another embodiment, high temperature heat pumps can produce condenser operating temperatures greater than about 75° C. In another embodiment, high temperature heat pumps can produce condenser operating temperatures greater than about 100° C. In another embodiment, high temperature heat pumps can produce condenser operating temperatures greater than about 120° C. The maximum condenser operating temperature that can be achieved in a high temperature heat pump will depend upon the working fluid used. This maximum condenser operating temperature is limited by the normal boiling characteristics of the working fluid and also by the pressure to which the heat pump's compressor can raise the vapor working fluid pressure. This maximum pressure is also related to the working fluid used in the heat pump.

In some embodiments, high temperature heat pumps can operate at condenser temperatures greater than about 55° C. In another embodiment, high temperature heat pumps can operate at condenser temperatures greater than about 60° C. In another embodiment, high temperature heat pumps can operate at condenser temperatures greater than about 65° C. In another embodiment, high temperature heat pumps can operate at condenser temperatures greater than about 75° C. In another embodiment, the high temperature heat pump operates at condenser temperatures greater than about 100° C. In another embodiment, high temperature heat pumps can produce condenser operating temperatures greater than about 120° C.

Of particular value are high temperature heat pumps that operate at condenser temperatures of 150° C. or higher. Alkyl perfluoroalkene ethers enable the design and operation of centrifugal heat pumps, operated at condenser temperatures higher than those accessible with many currently available working fluids. A working fluid comprising at least one alkyl perfluoroalkene ether may enable the design and operation of heat pumps, operated at condenser temperatures higher than those accessible with many currently available working fluids.

Also of note are heat pumps that are used to produce heating and cooling simultaneously. For instance, a single heat pump unit may produce heating to be used to generate high temperature steam for industrial use and may also produce cooling to be used to cool an industrial process stream.

Heat pumps, including both flooded evaporator and direct expansion, may be coupled with an air handling and distribution system to provide drying and dehumidification. In another embodiment, heat pumps may be used to heat water or generate steam.

To illustrate how heat pumps operate, reference is made to the Figures. A flooded evaporator heat pump is shown in FIG. 1.

In this heat pump a second heat transfer medium, which in some embodiments is a warm liquid, which may comprise water, and, in some embodiments, additives, or other heat transfer medium such as a glycol (e.g., ethylene glycol or propylene glycol), enters the heat pump carrying heat from a low temperature source (not shown), such as for instance, an industrial vessel or process stream, shown entering the heat pump at arrow 3, through a tube bundle or coil 9, in an evaporator 6, which has an inlet and an outlet. The warm second heat transfer medium is delivered to evaporator 6, where it is cooled by liquid working fluid, which is shown in the lower portion of evaporator 6. The liquid working fluid evaporates at a lower temperature than the warm first heat transfer medium which flows through tube bundle or coil 9. The cooled second heat transfer medium re-circulates back to the low temperature heat source as shown by arrow 4, via a return portion of tube bundle or coil 9. The liquid working fluid, shown in the lower portion of evaporator 6 in FIG. 1, vaporizes and is drawn into compressor 7, which increases the pressure and temperature of the working fluid vapor. Compressor 7 compresses this vapor so that it may be condensed in condenser 5 at a higher pressure and temperature than the pressure and temperature of the working fluid vapor when it exits evaporator 6. A first heat transfer medium enters the condenser via a tube bundle or coil 10 in condenser 5 from a location where high temperature heat is provided ("heat sink") such as a service water heater or a steam generation system at arrow 1 in FIG. 1. The first heat transfer medium is warmed in the process and returned via a return loop of tube bundle or coil 10 and arrow 2 to the heat sink. This first heat transfer medium cools the working fluid vapor in condenser 5 and causes the vapor to condense to liquid working fluid, so that there is liquid working fluid in the lower portion of condenser 5 as shown in FIG. 1. Condensed liquid working fluid in condenser 5 flows back to evaporator 6 through expansion device 8, which may be an orifice, capillary tube or expansion valve. Expansion device 8 reduces the pressure of the liquid working fluid, and converts the liquid working fluid at least partially to vapor, that is to say that the liquid working fluid flashes as pressure drops between condenser 5 and evaporator 6. Flashing cools the working fluid, i.e., both the liquid working fluid and the working fluid vapor to the saturated temperature at evaporator pressure, so that both liquid working fluid and working fluid vapor are present in evaporator 6.

In some embodiments the working fluid vapor is compressed to a supercritical state and condenser 5 is replaced by a gas cooler where the working fluid vapor is cooled to a liquid state without condensation.

In some embodiments the second heat transfer medium used in the apparatus depicted in FIG. 1 is a medium returning from a location where cooling is provided to a stream or a body to be cooled. Heat is extracted from the returning second heat transfer medium at the evaporator 6 and the cooled second heat transfer medium is supplied back to the location or body to be cooled. In this embodiment the apparatus depicted in FIG. 1 functions to simultaneously cool the second heat transfer medium that provides cooling to a body to be cooled (e.g. a process stream) and heat the first heat transfer medium that provides heating to a body to be heated (e.g. service water or steam or a process stream).

It is understood that the apparatus depicted in FIG. 1 can extract heat at the evaporator 6 from a wide variety of heat sources including solar, geothermal and waste heat and supply heat from the condenser 5 to a wide range of heat sinks.

It should be noted that for a single component working fluid composition, the composition of the vapor working fluid in the evaporator and condenser is the same as the composition of the liquid working fluid in the evaporator and condenser. In this case, evaporation will occur at a constant temperature. However, if a working fluid blend (or mixture) is used, as in the present invention, the liquid working fluid and the working fluid vapor in the evaporator (or in the condenser) may have different compositions. This may lead to inefficient systems and difficulties in servicing the equipment. An azeotrope or azeotrope-like composition will function essentially as a single component working fluid in a heat pump, such that the liquid composition and the vapor composition are essentially the same reducing any inefficiencies that might arise from the use of a non-azeotropic or non-azeotrope-like composition. The above discussion notwithstanding, in some embodiments zeotropic working fluids may be advantageous in creating condenser and/or evaporator temperature glides that largely match the temperature variations in the heat sink and/or heat source, respectively, so as to increase the effectiveness of heat exchange between the working fluid and the sink and/or source.

One embodiment of a direct expansion heat pump is illustrated in FIG. 2. In the heat pump as illustrated in FIG. 2, liquid second heat transfer medium, which in some embodiments is a warm liquid, such as warm water, enters evaporator 6' at inlet 14. Mostly liquid working fluid (with a small amount of working fluid vapor) enters coil 9' in the evaporator at arrow 3' and evaporates. As a result, second liquid heat transfer medium is cooled in evaporator 6', and a cooled second liquid heat transfer medium exits evaporator 6' at outlet 16, and is sent to low temperature heat source (e.g. warm water flowing to a cooling tower). The working fluid vapor exits evaporator 6' at arrow 4' and is sent to compressor 7', where it is compressed and exits as high temperature, high pressure working fluid vapor. This working fluid vapor enters condenser 5' through condenser coil 10' at 1'. The working fluid vapor is cooled by a liquid first heat transfer medium, such as water, in condenser 5' and becomes a liquid. The liquid first heat transfer medium enters condenser 5' through condenser heat transfer medium inlet 20. The liquid first heat transfer medium extracts heat from the condensing working fluid vapor, which becomes liquid working fluid, and this warms the liquid first heat transfer medium in condenser 5'. The liquid first heat transfer medium exits from condenser 5' through condenser heat transfer medium outlet 18. The condensed working fluid exits condenser 5' through lower coil or tube bundle 10' as shown in FIG. 2 and flows through expansion device 12, which may be an orifice, capillary tube or expansion valve. Expansion device 12 reduces the pressure of the liquid working fluid. A small amount of vapor, produced as a result of the expansion, enters evaporator 6' with liquid working fluid through coil 9' and the cycle repeats.

In some embodiments the working fluid vapor is compressed to a supercritical state and vessel 5' in FIG. 2 represents a gas cooler where the working fluid vapor is cooled to a liquid state without condensation.

In some embodiments the first liquid heating medium used in the apparatus depicted in FIG. 2 is a medium returning from a location where cooling is provided to a stream or a body to be cooled. Heat is extracted from the returning second heat transfer medium at the evaporator 6' and the cooled second heat transfer medium is supplied back to the location or body to be cooled. In this embodiment the apparatus depicted in FIG. 2 functions to simultaneously cool the second heat transfer medium (may be referred to as a liquid heating medium since it provides heating to the working fluid) that provides cooling to a body to be cooled (e.g. a process stream) and heat the first heat transfer medium (or liquid heating medium) that provides heating to a body to be heated (e.g. service water or process stream).

It is understood that the apparatus depicted in FIG. 2 can extract heat at the evaporator 6' from a wide variety of heat sources including solar, geothermal and waste heat and supply heat from the condenser 5' to a wide range of heat sinks.

Compressors useful in the present invention include dynamic compressors. Of note as examples of dynamic compressors are centrifugal compressors. A centrifugal compressor uses rotating elements to accelerate the working fluid radially, and typically includes an impeller and diffuser housed in a casing. Centrifugal compressors usually take working fluid in at an impeller eye, or central inlet of a circulating impeller, and accelerate it radially outward. Some static pressure rise occurs in the impeller, but most of the pressure rise occurs in the diffuser section of the casing, where velocity is converted to static pressure. Each impeller-diffuser set is a stage of the compressor. Centrifugal compressors are built with from 1 to 12 or more stages, depending on the final pressure desired and the volume of refrigerant to be handled.

The pressure ratio, or compression ratio, of a compressor is the ratio of absolute discharge pressure to the absolute inlet pressure. Pressure delivered by a centrifugal compressor is practically constant over a relatively wide range of capacities. The pressure a centrifugal compressor can develop depends on the tip speed of the impeller. Tip speed is the speed of the impeller measured at its tip and is related to the diameter of the impeller and its revolutions per minute The tip speed required in a specific application depends on the compressor work that is required to elevate the thermodynamic state of the working fluid from evaporator to condenser conditions. The volumetric flow capacity of the centrifugal compressor is determined by the size of the passages through the impeller. This makes the size of the compressor more dependent on the pressure required than the volumetric flow capacity required.

Also of note as examples of dynamic compressors are axial compressors. A compressor in which the fluid enters and leaves in the axial direction is called an axial flow compressor. Axial compressors are rotating, airfoil- or blade-based compressors in which the working fluid principally flows parallel to the axis of rotation. This is in contrast with other rotating compressors such as centrifugal or mixed-flow compressors where the working fluid may enter axially but will have a significant radial component on exit. Axial flow compressors produce a continuous flow of compressed gas, and have the benefits of high efficiencies and large mass flow capacity, particularly in relation to their cross-section. They do, however, require several rows of airfoils to achieve large pressure rises making them complex and expensive relative to other designs.

Compressors useful in the present invention also include positive displacement compressors. Positive displacement compressors draw vapor into a chamber, and the chamber decreases in volume to compress the vapor. After being compressed, the vapor is forced from the chamber by further decreasing the volume of the chamber to zero or nearly zero.

Of note as examples of positive displacement compressors are reciprocating compressors. Reciprocating compressors use pistons driven by a crankshaft. They can be either stationary or portable, can be single or multi-staged, and can be driven by electric motors or internal combustion engines. Small reciprocating compressors from 5 to 30 hp are seen in automotive applications and are typically for intermittent duty. Larger reciprocating compressors up to 100 hp are found in large industrial applications. Discharge pressures can range from low pressure to very high pressure (above 5000 psi or 35 MPa).

Also of note as examples of positive displacement compressors are screw compressors. Screw compressors use two meshed rotating positive-displacement helical screws to force the gas into a smaller space. Screw compressors are usually for continuous operation in commercial and industrial application and may be either stationary or portable. Their application can be from 5 hp (3.7 kW) to over 500 hp (375 kW) and from low pressure to very high pressure (above 1200 psi or 8.3 MPa).

Also of note as examples of positive displacement compressors are scroll compressors. Scroll compressors are similar to screw compressors and include two interleaved spiral-shaped scrolls to compress the gas. The output is more pulsed than that of a rotary screw compressor.

In one embodiment, the high temperature heat pump apparatus may comprise more than one heating circuit (or loop or stage) in a cascade arrangement. The performance (coefficient of performance for heating and volumetric heating capacity) of high temperature heat pumps operated with at least one alkyl perfluoroalkene ether as the working fluid is drastically improved when the evaporator is operated at temperatures approaching the condenser temperature required by the application. When the heat supplied to the evaporator is only available at low temperatures, thus requiring high temperature lifts leading to poor performance, a cascade cycle configuration with multiple circuits (or loops or stages) will be advantageous. The working fluid used in each cascade circuit (or loop or stage) is selected to have optimum thermodynamic and chemical stability properties for the temperature range encountered in the cascade circuit or stage in which the fluid is used.

In one embodiment of a cascade heat pump, the heat pump has two circuits or stages. In one embodiment, the low stage or low temperature circuit of the cascade cycle with two circuits or stages may be operated with a working fluid of lower boiling point than the boiling point of the working fluid used in the upper or high stage. In one embodiment, the high stage or high temperature circuit of the cascade cycle may be operated with a working fluid comprising at least one alkyl perfluoroalkene ether and optionally one or more compounds selected from hydrofluorocarbons, hydrochlorocarbons, hydrofluoroethers, hydrofluoroolefins, hydrochlorofluoroolefins, siloxanes, hydrocarbons, alcohols, perfluoropolyethers, and mixtures thereof and preferably with a low GWP. In another embodiment, the low stage or low temperature circuit of the cascade cycle may be operated with a working fluid comprising at least one compound selected from alkyl perfluoroalkene ethers, hydrofluorocarbons, hydrochlorocarbons, hydrofluoroethers, hydrofluoroolefins, hydrochlorofluoroolefins, siloxanes, hydrocarbons, alcohols, perfluoropolyethers, and mixtures thereof boiling at temperatures lower than the working fluid of the upper or higher stage and preferably with a low GWP. In one embodiment, the low stage or low temperature circuit of the cascade cycle would be operated with a working fluid comprising at least one compound selected from HFC-161, HFC-32, HFC-125, HFC-143a, HFC-245cb, HFC-134a, HFC-134, HFC-227ea, HFC-236ea, HFC-245fa, HFC-245eb, HFC-365mfc, HFC-4310mee, HFO-1234yf, HFO-1234ze-E, HFO-1234ze-Z, HFO-1336mzz-E, HFO-1336mzz-Z, HFO-1234ye-E or Z (1,2,3,3-tetrafluoropropene), HFO-1438mzz-E, HFO-1438mzz-Z, HFO-1438ezy-E, HFO-1438ezy-Z, HFO-1336yf, HFO-1336ze-E, HFO-1336ze-Z, HCFO-1233zd-E, HCFO-1233zd-Z, HCFO-1233xf, HFE-7000

(also known as HFE-347mcc or n-C$_3$F$_7$OCH$_3$), HFE-7100 (also known as HFE-449mccc or C$_4$F$_9$OCH$_3$), HFE-7200 (also known as HFE-569mccc or C$_4$F$_9$OC$_2$H$_5$), HFE-7500 (also known as 3-ethoxy-1,1,1,2,3,4,4,5,5,6,6,6-dodecafluoro-2-trifluoromethyl-hexane or (CF$_3$)$_2$CFCF(OC$_2$H$_5$) CF$_2$CF$_2$CF$_3$), 1,1,1,2,2,4,5,5,5-nonafluoro-4-(trifluoromethyl)-3-pentanone (sold under the trademark Novec™ 1230 by 3M, St. Paul, Minn., USA), octamethylcyclotetrasiloxane, decamethylcyclopentasiloxane, octamethyltrisiloxane (OMTS), hexamethyldisiloxane (HMDS), n-pentane, isopentane, cyclopentane, hexanes, cyclohexane, heptanes, and toluene. Also of particular utility in the method for producing heating are those embodiments wherein the working fluids have low GWP.

In another embodiment of a cascade heat pump, the heat pump has three circuits or stages. When the heat supplied to the evaporator is only available at even lower temperatures than in the previous example, thus requiring high temperature lifts leading to poor performance, a cascade cycle configuration with three stages or three circuits will be advantageous. In one embodiment, the lowest stage or lowest temperature circuit of the cascade cycle may be operated with a working fluid of lower boiling point than the boiling point of the working fluid used in the second or intermediate stage. In one embodiment, the high stage or high temperature circuit of the cascade cycle may be operated with a working fluid comprising at least one alkyl perfluoroalkene ether and optionally one or more compounds selected from hydrofluorocarbons, hydrochlorocarbons, hydrofluoroethers, hydrofluoroolefins, hydrochlorofluorolefins, siloxanes, hydrocarbons, alcohols, perfluoropolyethers, and mixtures thereof and preferably with a low GWP. In one embodiment, the intermediate stage or intermediate temperature circuit of the cascade cycle may be operated with a working fluid comprising at least one compound selected from alkyl perfluoroalkene ethers, hydrofluorocarbons, hydrochlorocarbons, hydrofluoroethers, hydrofluoroolefins, hydrochlorofluorolefins, siloxanes, hydrocarbons, alcohols, perfluoropolyethers, and mixtures thereof and preferably with a low GWP. In one embodiment, the low stage or low temperature circuit of the cascade cycle would be operated with a working fluid comprising at least one compound selected from alkyl perfluoroalkene ethers, hydrofluorocarbons, hydrochlorocarbons, hydrofluoroethers, hydrofluoroolefins, hydrochlorofluorolefins, siloxanes, hydrocarbons, alcohols, perfluoropolyethers, and mixtures thereof and preferably with a low GWP. In another embodiment, the low stage or low temperature circuit of the cascade cycle may be operated with a working fluid comprising at least one compound selected from HFC-161, HFC-32 (difluoromethane), HFC-125 (pentafluoroethane), HFC-143a (1,1,1-trifluoroethane), HFC-152a (1,1-difluoroethane), HFC-245cb, HFC-134a (1,1,1,2-tetrafluoroethane), HFC-134 (1,1,2,2-tetrafluoroethane), HFC-227ea (1,1,1,2,3,3,3-heptafluoropropene), HFC-236ea, HFC-245fa, HFC-245eb, HFC-365mfc, HFC-4310mee, HFO-1234yf, HFO-1234ze-E, HFO-1243zf (3,3,3-trifluoropropene), HFO-1234ze-Z, HFO-1336mzz-E, HFO-1234ye-E or Z (1,2,3,3-tetrafluoropropene), HFO-1336mzz-Z, HFO-1438mzz-E, HFO-1438mzz-Z, HFO-1438ezy-E, HFO-1438ezy-Z, HFO-1336yf, HFO-1336ze-E, HFO-1336ze-Z, HCFO-1233zd-E, HCFO-1233zd-Z, HCFO-1233xf, HFE-7000 (also known as HFE-347mcc or n-C$_3$F$_7$OCH$_3$), HFE-7100 (also known as HFE-449mccc or C$_4$F$_9$OCH$_3$), HFE-7200 (also known as HFE-569mccc or C$_4$F$_9$OC$_2$H$_5$), HFE-7500 (also known as 3-ethoxy-1,1,1,2,3,4,4,5,5,6,6,6-dodecafluoro-2-trifluoromethyl-hexane or (CF$_3$)$_2$CFCF(OC$_2$H$_5$)CF$_2$CF$_2$CF$_3$), 1,1,1,2, 2,4,5,5,5-nonafluoro-4-(trifluoromethyl)-3-pentanone (sold under the trademark Novec™ 1230 by 3M, St. Paul, Minn., USA), octamethylcyclotetrasiloxane, decamethylcyclopentasiloxane, octamethyltrisiloxane (OMTS), hexamethyldisiloxane (HMDS), n-pentane, isopentane, cyclopentane, hexanes, cyclohexane, heptanes, and toluene.

In one embodiment, the low stage or low temperature circuit of the three-stage cascade cycle may be operated with a working fluid comprising at least one compound selected from HFC-161, HFC-32 (difluoromethane), HFC-125 (pentafluoroethane), HFC-143a (1,1,1-trifluoroethane), HFC-152a (1,1-difluoroethane), HFC-245cb, HFC-134a (1,1,1,2-tetrafluoroethane), HFC-134 (1,1,2,2-tetrafluoroethane), HFC-227ea (1,1,1,2,3,3,3-heptafluoropropene), HFO-1234yf, HFO-1234ze-E, HFO-1243zf (3,3,3-trifluoropropene). Of note are working fluids for the low stage of a three-stage cascade heat pump such as HFO-1234yf/HFC-32, HFO-1234yf/HFC-32/HFC-125, HFO-1234yf/HFC-134a, HFO-1234yf/HFC-134a/HFC-32, HFO-1234yf/HFC-134, HFO-1234yf/HFC-134a/HFC-134, HFO-1234yf/HFC-32/HFC-125/HFC-134a, E-HFO-1234ze/HFC-32, E-HFO-1234ze/HFC-32/HFC-125, E-HFO-1234ze/HFC-134a, E-HFO-1234ze/HFC-134, E-HFO-1234ze/HFC-134a/HFC-134, E-HFO-1234ze/HFC-227ea, E-HFO-1234ze/HFC-134/HFC-227ea, E-HFO-1234ze/HFC-134/HFC-134a/HFC-227ea, HFO-1234yf/E-HFO-1234ze/HFC-134/HFC-134a/HFC-227ea, etc. Also of particular utility in the method for producing heating are those embodiments wherein the working fluids have low GWPs.

The evaporator of the low temperature circuit (or low temperature loop) of the two-stage cascade cycle receives the available low temperature heat, lifts the heat to a temperature intermediate between the temperature of the available low temperature heat and the temperature of the required heating duty and transfers the heat to the high stage or high temperature circuit (or high temperature loop) of the cascade system at a cascade heat exchanger. Then the high temperature circuit, operated with a working fluid comprising at least one alkyl perfluoroalkene ether, further lifts the heat received at the cascade heat exchanger to the required condenser temperature to meet the intended heating duty. The cascade concept can be extended to configurations with three or more circuits lifting heat over wider temperature ranges and using different fluids over different temperature sub-ranges to optimize performance.

In one embodiment of the high temperature heat pump apparatus having more than one stage, the working fluid used in the lowest temperature stage comprises at least one fluoroolefin selected from the group consisting of HFO-1234yf, E-HFO-1234ze, HFO-1234ye (E- or Z-isomer), HFO-1336mzz-E, and HFC-1243zf.

In another embodiment of the high temperature heat pump apparatus having more than one stage, the working fluid used in the lowest temperature stage comprises at least one fluoroalkane selected from the group consisting of HFC-161, HFC-32, HFC-125, HFC-245cb, HFC-134a, HFC-134, HFC-143a, HFC-152a and HFC-227ea.

In another embodiment of the high temperature heat pump apparatus having more than one stage, the working fluid of the stage preceding the final or highest-temperature stage comprises at least one fluoroolefin or chlorofluoroolefin selected from the group consisting of HFO-1234yf, HFO-1234ze-E, HFO-1243zf (3,3,3-trifluoropropene), HFO-1234ze-Z, HFO-1336mzz-E, HFO-1234ye-E or Z (1,2,3,3-tetrafluoropropene, E- or Z-isomer), HFO-1336mzz-Z, HFO-1438mzz-E, HFO-1438mzz-Z, HFO-1438ezy-E, HFO-1438ezy-Z, HFO-1336yf, HFO-1336ze-E, HFO-1336ze-Z, HCFO-1233zd-E, HCFO-1233zd-Z, HCFO-1233xf.

In another embodiment of the high temperature heat pump apparatus having more than one stage, wherein the working fluid of the stage preceding the final or highest-temperature stage comprises at least one fluoroalkane selected from the group consisting of HFC-161, HFC-32, HFC-125, HFC-245cb, HFC-134a, HFC-134, HFC-143a, HFC-152a and HFC-227ea, HFC-236ea, HFC-245fa, HFC-245eb, HFC-365mfc, HFC-4310mee.

In accordance with the present invention, there is provided a cascade heat pump system having at least two heating loops for circulating a working fluid through each loop. In one embodiment, the high temperature heat pump apparatus has at least two heating stages arranged as a cascade heating system, wherein each stage is in thermal communication with the next stage and wherein each stage circulates a working fluid therethrough, wherein heat is transferred to the final or upper or highest-temperature stage from the immediately preceding stage and wherein the heating fluid of the final stage comprises at least one alkyl perfluoroalkene ether.

Figure 3:
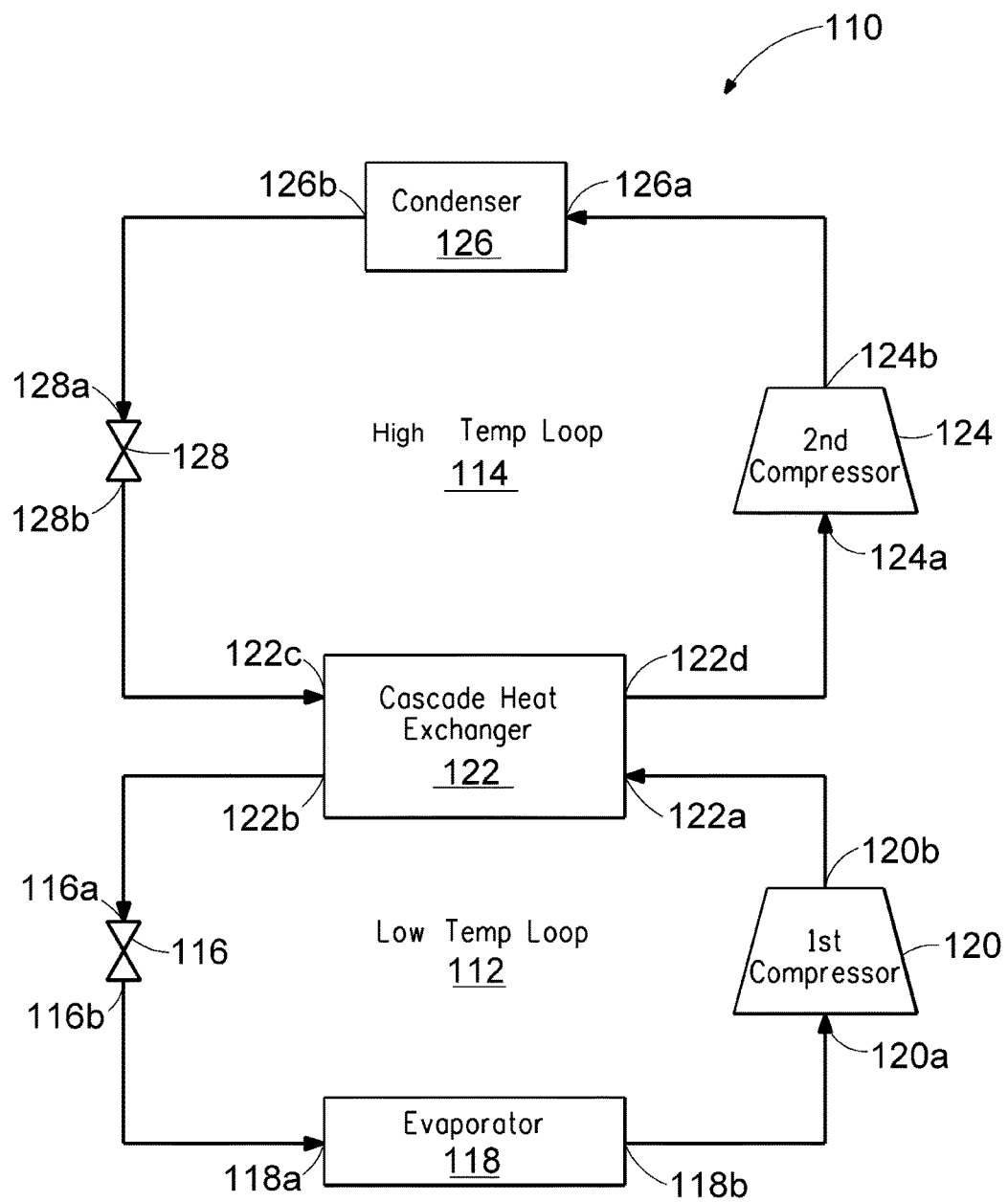
FIG. 3 is a schematic diagram of a cascade heating pump system according to the present invention.

In another embodiment the high temperature heat pump apparatus has at least two heating stages arranged as a cascade heating system, each stage circulating a working fluid therethrough comprising (a) a first expansion device for reducing the pressure and temperature of a first working fluid liquid; (b) an evaporator in fluid communication with the first expansion device having an inlet and an outlet; (c) a first compressor in fluid communication with the evaporator and having an inlet and an outlet; (d) a cascade heat exchanger system in fluid communication with the first compressor and having: (i) a first inlet and a first outlet, and (ii) a second inlet and a second outlet in thermal communication with the first inlet and outlet; (e) a second compressor in fluid communication with the second outlet of the cascade heat exchanger and having an inlet and an outlet; (f) a condenser in fluid communication with the second compressor and having an inlet and an outlet; and (g) a second expansion device in fluid communication with the condenser; wherein the second working fluids comprises at least one alkyl perfluoroalkene ether. In accordance with the present invention, there is provided a cascade heat pump system having at least two heating loops for circulating a working fluid through each loop. One embodiment of such a cascade system is shown generally at 110 in FIG. 3. Cascade heat pump system 110 of the present invention has at least two heating loops, including a first, or lower loop 112, which is a low temperature loop, and a second, or upper loop 114, which is a high temperature loop 114 as shown in FIG. 3. Each circulates a working fluid therethrough.

Cascade heat pump system 110 includes first expansion device 116. First expansion device 116 has an inlet 116a and an outlet 116b. First expansion device 116 reduces the pressure and temperature of a first working fluid liquid which circulates through the first or low temperature loop 112.

Cascade heat pump system 110 also includes evaporator 118. Evaporator 118 has an inlet 118a and an outlet 118b. The first working fluid liquid from first expansion device 116 enters evaporator 118 through evaporator inlet 118a and is evaporated in evaporator 118 to form a first working fluid vapor. The first working fluid vapor then circulates to evaporator outlet 118b.

Cascade heat pump system 110 also includes first compressor 120. First compressor 120 has an inlet 120a and an outlet 120b. The first working fluid vapor from evaporator 118 circulates to inlet 120a of first compressor 120 and is compressed, thereby increasing the pressure and the temperature of the first working fluid vapor. The compressed first working fluid vapor then circulates to the outlet 120b of the first compressor 120.

Cascade heat pump system 110 also includes cascade heat exchanger system 122. Cascade heat exchanger 122 has a first inlet 122a and a first outlet 122b. The first working fluid vapor from first compressor 120 enters first inlet 122a of heat exchanger 122 and is condensed in heat exchanger 122 to form a first working fluid liquid, thereby rejecting heat. The first working fluid liquid then circulates to first outlet 122b of heat exchanger 122. Heat exchanger 122 also includes a second inlet 122c and a second outlet 122d. A second working fluid liquid circulates from second inlet 122c to second outlet 122d of heat exchanger 122 and is evaporated to form a second working fluid vapor, thereby absorbing the heat rejected by the first working fluid (as it is condensed). The second working fluid vapor then circulates to second outlet 122d of heat exchanger 122. Thus, in the embodiment of FIG. 3, the heat rejected by the first working fluid is directly absorbed by the second working fluid.

Cascade heat pump system 110 also includes second compressor 124. Second compressor 124 has an inlet 124a and an outlet 124b. The second working fluid vapor from cascade heat exchanger 122 is drawn into compressor 124 through inlet 124a and is compressed, thereby increasing the pressure and temperature of the second working fluid vapor. The second working fluid vapor then circulates to outlet 124b of second compressor 124.

Cascade heat pump system 110 also includes condenser 126 having an inlet 126a and an outlet 126b. The second working fluid from second compressor 124 circulates from inlet 126a and is condensed in condenser 126 to form a second working fluid liquid, thus producing heat. The second working fluid liquid exits condenser 126 through outlet 126b.

Cascade heat pump system 110 also includes second expansion device 128 having an inlet 128a and an outlet 128b. The second working fluid liquid passes through second expansion device 128, which reduces the pressure and temperature of the second working fluid liquid exiting condenser 126. This liquid may be partially vaporized during this expansion. The reduced pressure and temperature second working fluid liquid circulates to second inlet 122c of cascade heat exchanger system 122 from expansion device 128.

Moreover, the stability of alkyl perfluoroalkene ethers at temperatures higher than their critical temperatures enables the design of heat pumps operated according to a supercritical or transcritical cycle in which heat is rejected by the working fluid in a supercritical state and made available for use over a range of temperatures (including temperatures higher than the critical temperature of the alkyl perfluoroalkene ethers). The supercritical fluid is cooled to a liquid state without passing through an isothermal condensation transition.

For high temperature condenser operation (associated with high temperature lifts and high compressor discharge temperatures) formulations of working fluid (e.g. methyl perfluoroheptene ethers) and lubricants with high thermal stability (possibly in combination with oil cooling or other mitigation approaches such as fluid injection during the compression stage) will be advantageous.

For high temperature condenser operation (associated with high temperature lifts and high compressor discharge temperatures) the use of magnetic centrifugal compressors (e.g., Danfoss-Turbocor type) that do not require the use of lubricants will be advantageous.

For high temperature condenser operation (associated with high temperature lifts and high compressor discharge temperatures) the use of compressor materials (e.g. shaft seals, etc) with high thermal stability may also be required.

The compositions comprising at least one alkyl perfluoroalkene ether may be used in a high temperature heat pump apparatus in combination with molecular sieves to aid in removal of moisture. Desiccants may be composed of activated alumina, silica gel, or zeolite-based molecular sieves. In some embodiments, the molecular sieves are most useful with a pore size of approximately 3 Angstroms to 6 Angstroms. Representative molecular sieves include MOLSIV XH-7, XH-6, XH-9 and XH-11 (UOP LLC, Des Plaines, Ill.).

High Temperature Heat Pump Compositions

A composition is provided for use in high temperature heat pumps. The composition comprises (i) a working fluid consisting essentially of at least one alkyl perfluoroalkene ether; and (ii) a stabilizer to prevent degradation at temperatures of 55° C. or above; or (iii) a lubricant suitable for use at 55° C. or above, or both (ii) and (iii). Of note are compositions wherein the working fluid component consists essentially of at least one alkyl perfluoroalkene ether or wherein the working fluid component consists of at least one alkyl perfluoroalkene ether.

In one embodiment of the composition for use in high temperature heat pumps, the working fluid comprises at least one alkyl perfluoroalkene ether selected from the group consisting of:
a) compounds of formula $CF_3(CF_2)_xCF=CFCF(OR)(CF_2)_yCF_3$, $CF_3(CF_2)_xC(OR)=CFCF_2(CF_2)_yCF_3$, $CF_3CF=CFCF(OR)(CF_2)_x(CF_2)_yCF_3$, $CF_3(CF_2)_xCF=C(OR)CF_2(CF_2)_yCF_3$, or mixtures thereof, wherein R can be either $CH_3$, $C_2H_5$ or mixtures thereof, and wherein x and y are independently 0, 1, 2 or 3, and wherein x+y=0, 1, 2 or 3 having the formula;
b) compounds of formulas $CF_3(CF_2)_xCF=CFCF(OR)(CF_2)_yCF_3$, $CF_3(CF_2)_xC(OR)=CFCF_2(CF_2)_yCF_3$, $CF_3CF=CFCF(OR)(CF_2)_x(CF_2)_yCF_3$, $CF_3(CF_2)_xCF=C(OR)CF_2(CF_2)_yCF_3$, and mixtures thereof; wherein x and y are independently 0, 1, 2, 3 or 4 and wherein x+y=0, 1, 2, 3 or 4; and wherein R is 2,2,3,3-tetrafluoro-1-propyl, 2,2,3,3,3-pentafluoro-1-propyl, 2,2,2-trifluoro-1-ethyl, 2,2,3,3,4,4,5,5-octafluoro-1-pentyl, or 1,1,1,3,3,3-hexafluoro-2-propyl; and
c) mixtures of compounds from (a) and (b).

In one embodiment of the composition for use in high temperature heat pumps, the alkyl perfluoroalkene ethers comprise at least one of 5-methoxyperfluoro-3-heptene, 3-methoxyperfluoro-3-heptene, 4-methoxyperfluoro-2-heptene, 3-methoxyperfluoro-2-heptene, or mixtures thereof.

In one embodiment of the composition for use in high temperature heat pumps, the alkyl perfluoroalkene ethers comprise at least one of 4-methoxyperfluoro-2-pentene, 2-methoxyperfluoro-2-pentene, 3-methoxyperfluoro-2-pentene, 2-methoxyperfluoro-3-pentene, or mixtures thereof.

In one embodiment of the composition for use in high temperature heat pumps, the alkyl perfluoroalkene ethers comprise at least one of cis- and trans-2-methoxyperfluoro-2-octene, 2-methoxyperfluoro-3-octene, or mixtures thereof.

In one embodiment of the composition for use in high temperature heat pumps, the working fluid further comprises at least one compound selected from hydrofluorocarbons, hydrochlorocarbons, hydrofluoroethers, hydrofluoroolefins, hydrochlorofluoroolefins, siloxanes, hydrocarbons, alcohols, perfluoropolyethers, and mixtures thereof.

In one embodiment of the composition for use in high temperature heat pumps, the working fluid comprises azeotropic or near-azeotropic mixtures. In one embodiment, the azeotropic or near azeotropic mixture comprises at least one methyl perfluoroheptene ether and at least one compound selected from the group consisting of heptane, ethanol, trans-1,2-dichloroethene, and mixtures thereof.

In another embodiment composition for use in high temperature heat pumps, the azeotropic or near azeotropic mixture comprises at least one methyl perfluoropentene ether and at least one compound selected from the group consisting of trans-1,2-dichloroethene, methanol, ethanol, 2-propanol, cyclopentane, ethyl formate, methyl formate, 1-bromopropane, and mixtures thereof.

Of note for use in high temperature heat pumps are working fluids that are azeotropic or azeotrope-like mixtures. Mixtures that are not azeotropic or azeotrope-like fractionate to some degree while in use in a high temperature heat pump.

In one embodiment of the composition for use in high temperature heat pumps, the working fluid comprises azeotropic or near-azeotropic mixtures. In one embodiment, the azeotropic or near azeotropic mixture comprises at least one methyl perfluoroheptene ether and at least one compound selected from the group consisting of heptane, ethanol, trans-1,2-dichloroethene, and mixtures thereof.

In another embodiment composition for use in high temperature heat pumps, the azeotropic or near azeotropic mixture comprises at least one methyl perfluoropentene ether and at least one compound selected from the group consisting of trans-1,2-dichloroethene, methanol, ethanol, 2-propanol, cyclopentane, ethyl formate, methyl formate, 1-bromopropane, and mixtures thereof.

Any of the compositions described herein can be used in a high temperature heat pump. Of note are compositions comprising at least one alkyl perfluoroalkene ether that are particularly useful in high temperature heat pumps, which are azeotropic or azeotrope-like. Azeotropic compositions will have zero glide in the heat exchangers, e.g., evaporator and condenser, of a high temperature heat pump.

It has been disclosed that at least one alkyl perfluoroalkene ethers form azeotropic and azeotrope-like compositions. In particular, azeotropic and near azeotropic blends of methyl perfluoroheptene ethers with heptane are disclosed in U.S. Patent Application Publication No. 2012/0157362 A1. Also, azeotropic and near azeotropic blends of methyl perfluoroheptene ethers with ethanol are disclosed in U.S. Patent Application Publication No. 2012/0157363 A1. Also, azeotropic and near azeotropic blends of methyl perfluoroheptene ethers with trans-1,2-dichloroethene are disclosed in U.S. Patent Application Publication No. 2012/0227764 A1.

Further, azeotropic or near azeotropic blends of methyl perfluoropentene ethers with trans-1,2-dichloroethene, methanol, ethanol, 2-propanol, heptane, hexane, cyclopentane, ethyl formate, methyl formate, $C_4F_9OCH_3$, $C_4F_9OC_2H_5$, HFC-365mfc ($CF_3CH_2CF_2CH_3$) and/or 1-bromopropane are disclosed in International Patent Application Publication No. WO 2013/040266 A1.

In yet another embodiment of the high temperature heat pump apparatus, the working fluid comprises at least one alkyl perfluoroalkene ether and optionally one or more fluids selected from the group consisting of HFC-161, HFC-32, HFC-125, HFC-143a, HFC-245cb, HFC-134a, HFC-134, HFC-227ea, HFC-236ea, HFC-245fa, HFC-245eb, HFC-365mfc, HFC-4310mee, HFO-1234yf, HFO-1234ze-E, HFO-1234ze-Z, HFO-1336mzz-E, HFO-1336mzz-Z, HFO-1234ye-E or Z (1,2,3,3-tetrafluoropropene), HFO-1438mzz-E, HFO-1438mzz-Z, HFO-1438ezy-E, HFO-1438ezy-Z, HCFO-1233zd-E, HCFO-1233zd-Z, HCFO-1233xf, HFE-7000 (also known as HFE-347mcc or n-$C_3F_7OCH_3$), HFE-7100 (also known as HFE-449mccc or $C_4F_9OCH_3$), HFE-7200 (also known as HFE-569mccc or $C_4F_9OC_2H_5$), HFE-7500 (also known as 3-ethoxy-1,1,1,2,3,4,4,5,5,6,6,6-dodecafluoro-2-trifluoromethyl-hexane or $(CF_3)_2CFCF(OC_2H_5)CF_2CF_2CF_3$), 1,1,1,2,2,4,5,5,5-nonafluoro-4-(trifluoromethyl)-3-pentanone (sold under the trademark Novec™ 1230 by 3M, St. Paul, Minn., USA), octamethylcyclotetrasiloxane, decamethylcyclopentasiloxane, octamethyltrisiloxane (OMTS), hexamethyldisiloxane (HMDS), n-pentane, isopentane, cyclopentane, hexanes, cyclohexane, heptanes, and toluene.

Of note are non-flammable compositions comprising at least one alkyl perfluoroalkene ether. It is expected that certain compositions comprising at least one alkyl perfluoroalkene ether and other compounds as disclosed herein may be non-flammable by standard test ASTM 681.

Also of particular utility are any compositions wherein the working fluid has a low GWP.

Any of the compositions comprising at least one alkyl perfluoroalkene ether may also comprise and/or be used in combination with at least one lubricant selected from the group consisting of polyalkylene glycols, polyol esters, polyvinylethers, mineral oils, alkylbenzenes, synthetic paraffins, synthetic naphthenes, perfluoropolyethers, and poly(alpha)olefins.

Useful lubricants include those suitable for use with high temperature heat pump apparatus. Among these lubricants are those conventionally used in vapor compression refrigeration apparatus utilizing chlorofluorocarbon refrigerants. In one embodiment, lubricants comprise those commonly known as "mineral oils" in the field of compression refrigeration lubrication. Mineral oils comprise paraffins (i.e., straight-chain and branched-carbon-chain, saturated hydrocarbons), naphthenes (i.e. cyclic paraffins) and aromatics (i.e. unsaturated, cyclic hydrocarbons containing one or more rings characterized by alternating double bonds). In one embodiment, lubricants comprise those commonly known as "synthetic oils" in the field of compression refrigeration lubrication. Synthetic oils comprise alkylaryls (i.e. linear and branched alkyl alkylbenzenes), synthetic paraffins and naphthenes, and poly(alphaolefins). Representative conventional lubricants are the commercially available BVM 100 N (paraffinic mineral oil sold by BVA Oils), naphthenic mineral oil commercially available from Crompton Co. under the trademarks Suniso® 3GS and Suniso® 5GS, naphthenic mineral oil commercially available from Pennzoil under the trademark Sontex® 372LT, naphthenic mineral oil commercially available from Calumet Lubricants under the trademark Calumet® RO-30, linear alkylbenzenes commercially available from Shrieve Chemicals under the trademarks Zerol® 75, Zerol® 150 and Zerol® 500, and HAB 22 (branched alkylbenzene sold by Nippon Oil).

Useful lubricants may also include those which have been designed for use with hydrofluorocarbon refrigerants and are miscible with refrigerants of the present invention under compression refrigeration and air-conditioning apparatus' operating conditions. Such lubricants include, but are not limited to, polyol esters (POEs) such as Castrol® 100 (Castrol, United Kingdom), polyalkylene glycols (PAGs) such as RL-488A from Dow (Dow Chemical, Midland, Mich.), polyvinyl ethers (PVEs), and polycarbonates (PCs).

Lubricants are selected by considering a given compressor's requirements and the environment to which the lubricant will be exposed.

Of note are high temperature lubricants with stability at high temperatures. The highest temperature the heat pump will achieve will determine which lubricants are required. In one embodiment, the lubricant must be stable at temperatures of at least 55° C. In another embodiment the lubricant must be stable at temperatures of at least 100° C. In another embodiment, the lubricant must be stable at temperatures of at least 125° C. In another embodiment the lubricant must be stable at temperatures of at least 150° C. Of particular note are poly alpha olefins (POA) lubricants with stability up to about 200-250° C. and polyol ester (POE) lubricants with stability at temperatures up to about 200 to 250° C. Also of particular note are perfluoropolyether lubricants that have stability at temperatures up to from about 220 to about 350° C. PFPE lubricants include those available from DuPont (Wilmington, Del.) under the trademark Krytox®, such as the XHT series with thermal stability up to about 300 to 350° C. Other PFPE lubricants include those sold under the trademark Demnum™ from Daikin Industries (Japan) with thermal stability up to about 280 to 330° C., and available from Ausimont (Milan, Italy), under the trademarks Fomblin® and Galden® such as that available under the trademark Fomblin®-Y or Fomblin®-Z with thermal stability up to about 220 to 260° C.

For high temperature condenser operation (associated with high temperature lifts and high compressor discharge temperatures) formulations of working fluid (e.g. at least one alkyl perfluoroalkene ether) and lubricants with high thermal stability (possibly in combination with oil cooling or other mitigation approaches) will be advantageous.

In one embodiment, the present invention includes a composition comprising: (a) at least one alkyl perfluoroalkene ether; and (b) at least one lubricant suitable for use at a temperature of at least about 100° C. Of note are embodiments wherein the lubricant is suitable for use at a temperature of at least about 150° C. Also of note are embodiments wherein the lubricant is suitable for use at a temperature of at least about 165° C. Also of note are embodiments wherein the lubricant is suitable for use at a temperature of at least about 175° C. Also of note are embodiments wherein the lubricant is suitable for use at a temperature of at least about 200° C. Also of note are embodiments wherein the lubricant is suitable for use at a temperature of at least about 225° C. Also of note are embodiments wherein the lubricant is suitable for use at a temperature of at least about 250° C.

In one embodiment, any of the compositions of this invention may further comprise 0.01 weight percent to 5 weight percent of a stabilizer, free radical scavenger or antioxidant. Such other additives include but are not limited to, nitromethane, hindered phenols, hydroxylamines, thiols, phosphites, or lactones. Single additives or combinations may be used.

Optionally, in another embodiment, certain refrigeration, air-conditioning, or heat pump system additives may be added, as desired, to the any of the working fluids as disclosed herein in order to enhance performance and system stability. These additives are known in the field of refrigeration and air-conditioning, and include, but are not limited to, anti-wear agents, extreme pressure lubricants, corrosion and oxidation inhibitors, metal surface deactivators, free radical scavengers, and foam control agents. In general, these additives may be present in the working fluids in small amounts relative to the overall composition. Typically concentrations of from less than 0.1 weight percent to as much as 3 weight percent of each additive are used. These additives are selected on the basis of the individual system requirements. These additives include members of the triaryl phosphate family of EP (extreme pressure) lubricity additives, such as butylated triphenyl phosphates (BTPP), or other alkylated triaryl phosphate esters, e.g. Syn-O-Ad 8478 from Akzo Chemicals, tricresyl phosphates and related compounds. Additionally, the metal dialkyl dithiophosphates (e.g., zinc dialkyl dithiophosphate (or ZDDP), Lubrizol 1375 and other members of this family of chemicals may be used in compositions of the present invention. Other anti-wear additives include natural product oils and asymmetrical polyhydroxyl lubrication additives, such as Synergol TMS (International Lubricants). Similarly, stabilizers such as antioxidants, free radical scavengers, and water scavengers may be employed. Compounds in this category can include, but are not limited to, butylated hydroxy toluene (BHT), epoxides, and mixtures thereof. Corrosion inhibitors include dodecyl succinic acid (DDSA), amine phosphate (AP), oleoyl sarcosine, imidazone derivatives and substituted sulfphonates. Metal surface deactivators include areoxalyl bis (benzylidene)hydrazide, N,N'-bis(3,5-di-tert-butyl-4-hydroxyhydrocinnamoylhydrazine, 2,2,'-oxamidobis-ethyl-(3, 5-di-tert-butyl-4-hydroxyhydrocinnamate, N,N'-(disalicyclidene)-1,2-diaminopropane and ethylenediaminetetra-acetic acid and its salts, and mixtures thereof.

Any of the present compositions may include stabilizers comprising at least one compound selected from the group consisting of hindered phenols, thiophosphates, butylated triphenylphosphorothionates, organo phosphates, or phosphites, aryl alkyl ethers, terpenes, terpenoids, epoxides, fluorinated epoxides, oxetanes, ascorbic acid, thiols, lactones, thioethers, amines, nitromethane, alkylsilanes, benzophenone derivatives, aryl sulfides, divinyl terephthalic acid, diphenyl terephthalic acid, ionic liquids, and mixtures thereof. Representative stabilizer compounds include but are not limited to tocopherol; hydroquinone; t-butyl hydroquinone; monothiophosphates; and dithiophosphates, commercially available from Ciba Specialty Chemicals, Basel, Switzerland, hereinafter "Ciba," under the trademark Irgalube® 63; dialkylthiophosphate esters, commercially available from Ciba under the trademarks Irgalube® 353 and Irgalube® 350, respectively; butylated triphenylphosphorothionates, commercially available from Ciba under the trademark Irgalube® 232; amine phosphates, commercially available from Ciba under the trademark Irgalube® 349 (Ciba); hindered phosphites, commercially available from Ciba as Irgafos® 168; a phosphate such as (Tris-(di-tert-butylphenyl), commercially available from Ciba under the trademark Irgafos® OPH; (Di-n-octyl phosphite); and iso-decyl diphenyl phosphite, commercially available from Ciba under the trademark Irgafos® DDPP; anisole; 1,4-dimethoxybenzene; 1,4-diethoxybenzene; 1,3,5-trimethoxybenzene; d-limonene; retinal; pinene; menthol; Vitamin A; terpinene; dipentene; lycopene; beta carotene; bornane; 1,2-propylene oxide; 1,2-butylene oxide; n-butyl glycidyl ether; trifluoromethyloxirane; 1,1-bis(trifluoromethyl)oxirane; 3-ethyl-3-hydroxymethyl-oxetane, such as OXT-101 (Toagosei Co., Ltd); 3-ethyl-3-((phenoxy)methyl)-oxetane, such as OXT-211 (Toagosei Co., Ltd); 3-ethyl-3-((2-ethylhexyloxy)methyl)-oxetane, such as OXT-212 (Toagosei Co., Ltd); ascorbic acid; methanethiol(methyl mercaptan); ethanethiol (ethyl mercaptan); Coenzyme A; dimercaptosuccinic acid (DMSA); grapefruit mercaptan ((R)-2-(4-methyl-cyclohex-3-enyl)propane-2-thiol)); cysteine ((R)-2-amino-3-sulfanyl-propanoic acid); lipoamide(1,2-dithiolane-3-pentanamide); 5,7-bis(1,1-dimethylethyl)-3-[2,3(or 3,4)-dimethylphenyl]-2(3H)-benzofuranone, commercially available from Ciba under the trademark Irganox® HP-136; benzyl phenyl sulfide; diphenyl sulfide; diisopropylamine; dioctadecyl 3,3'-thiodipropionate, commercially available from Ciba under the trademark Irganox® PS 802 (Ciba); didodecyl 3,3'-thiopropionate, commercially available from Ciba under the trademark Irganox® PS 800; di-(2,2,6,6-tetramethyl-4-piperidyl)sebacate, commercially available from Ciba under the trademark Tinuvin® 770; poly-(N-hydroxyethyl-2,2,6,6-tetramethyl-4-hydroxy-piperidyl succinate, commercially available from Ciba under the trademark Tinuvin® 622LD (Ciba); methyl bis tallow amine; bis tallow amine; phenol-alpha-naphthylamine; bis(dimethylamino)methylsilane (DMAMS); tris(trimethylsilyl)silane (TTMSS); vinyltriethoxysilane; vinyltrimethoxysilane; 2,5-difluorobenzophenone; 2',5'-dihydroxyacetophenone; 2-aminobenzophenone; 2-chlorobenzophenone; benzyl phenyl sulfide; diphenyl sulfide; dibenzyl sulfide; ionic liquids; and others.

In one embodiment, ionic liquid stabilizers comprise at least one ionic liquid. Ionic liquids are organic salts that are liquid or have melting points below 100° C. In another embodiment, ionic liquid stabilizers comprise salts containing cations selected from the group consisting of pyridinium, pyridazinium, pyrimidinium, pyrazinium, imidazolium, pyrazolium, thiazolium, oxazolium and triazolium; and anions selected from the group consisting of $[BF_4]—$, $[PF_6]—$, $[SbF_6]—$, $[CF_3SO_3]—$, $[HCF_2CF_2SO_3]—$, $[CF_3HFCCF_2SO_3]—$, $[HCClFCF_2SO_3]—$, $[(CF_3SO_2)_2N]—$, $[(CF_3CF_2SO_2)_2N]—$, $[(CF_3SO_2)_3C]—$, $[CF_3CO_2]—$, and F—. Representative ionic liquid stabilizers include emim $BF_4$ (1-ethyl-3-methylimidazolium tetrafluoroborate); bmim $BF_4$ (1-butyl-3-methylimidazolium tetraborate); emim $PF_6$ (1-ethyl-3-methylimidazolium hexafluorophosphate); and bmim $PF_6$ (1-butyl-3-methylimidazolium hexafluorophosphate), all of which are available from Fluka (Sigma-Aldrich).

EXAMPLES

The concepts described herein will be further described in the following example, which does not limit the scope of the invention described in the claims.

Example 1

Heat Pump with Vertrel® HFX-110 as the Working Fluid Delivering a Condensing Temperature of 200° C.

Vertrel® HFX-110 is a mixture of methyl perfluoroheptene ether isomers available from E.I. DuPont de Nemours & Co., Wilmington, Del., USA. Table 1 compares the performance of a heat pump operating with Vertrel® HFX-110 as the working fluid to the performance with n-heptane as the working fluid. The heat pump is used to lift heat from an evaporating temperature of 150° C. to a condensing temperature of 200° C. The critical temperatures of Vertrel® HFX-110 and n-heptane are sufficiently high to enable a condensing temperature of 200° C. The heat pump energy efficiency is quantified in terms of the Coefficient of Performance for heating, COPh, defined as the ratio of the heat delivered (including compressed vapor de-superheating, condensation and liquid sub-cooling) and the work of compression. The volumetric heating capacity, CAPh, is defined as the amount of heat delivered (including compressed vapor de-superheating, condensation and liquid sub-cooling) per unit volume of working fluid entering the compressor.

TABLE 1

Performance of a Heat Pump Operating with Vertrel ® HFX-110 as the Working Fluid Compared to n-Heptane

|  |  | n-Heptane | Vertrel ® HFX-110 | HFX-110 vs. n-Heptane (%) |
|---|---|---|---|---|
| $T_{cr}$ | ° C. | 267.0 | 240.0 |  |
| $T_{cond}$ | ° C. | 200 | 200 |  |
| $T_{evap}$ | ° C. | 150 | 150 |  |
| Superheat | K | 35 | 35 |  |
| Subcool | K | 25 | 25 |  |
| Compressor Efficiency |  | 0.7 | 0.7 |  |
| $P_{cond}$ | MPa | 0.98 | 0.86 |  |
| $P_{evap}$ | MPa | 0.37 | 0.30 |  |
| $T_{disch}$ | ° C. | 211.74 | 204.86 |  |
| $COP_h$ |  | 7.269 | 7.573 | 4.2 |
| $CAP_h$ | kJ/m$^3$ | 3,596.87 | 3,177.73 | −11.7 |

The heat pump performance for Vertrel® HFX-110 ($COP_h$=7.573; $CAP_h$=3,177.73 kJ/m$^3$) would be attractive. The energy efficiency (in terms of COP) for heating with Vertrel® HFX-110 would be 4.2% higher than with n-Heptane, while the volumetric heating capacity with Vertrel® HFX-110 would remain competitive. Moreover, Vertrel® HFX-110 is non-flammable while n-Heptane is flammable. The compressor discharge temperature with Vertrel® HFX-110 would be lower than with n-Heptane. The high discharge temperatures would require suitable materials of equipment construction and suitable high-temperature lubricants (or oil-less compressors).

Example 2

Chemical Stability of Vertrel® HFX-110

The chemical stability of HFX-110 in the presence of metals was assessed according to the sealed tube testing methodology of ANSI/ASHRAE Standard 97-2007. Sealed glass tubes, each containing three metal coupons made of steel, copper, and aluminum immersed in Vertrel® HFX-110, were aged in a heated oven at 225° C. for 7 days. The measured concentration of fluoride ion in two aged liquid samples averaged 53 ppm, indicating that the degradation of HFX-110 was minimal. The sample purity after aging remained high and comparable to the purity of the unaged sample.

Selected Embodiments

Embodiment A1

A composition comprising at least one alkyl perfluoroalkene ether selected from the group consisting of:
a) compounds of formula $CF_3(CF_2)_xCF=CFCF(OR)(CF_2)_yCF_3$, $CF_3(CF_2)_xC(OR)=CFCF_2(CF_2)_yCF_3$, $CF_3CF=CFCF(OR)(CF_2)_x(CF_2)_yCF_3$, $CF_3(CF_2)_xCF=C(OR)CF_2(CF_2)_yCF_3$, or mixtures thereof, wherein R can be either $CH_3$, $C_2H_5$ or mixtures thereof, and wherein x and y are independently 0, 1, 2 or 3, and wherein x+y=0, 1, 2 or 3 having the formula;
b) compounds of formulas $CF_3(CF_2)_xCF=CFCF(OR)(CF_2)_yCF_3$, $CF_3(CF_2)_xC(OR)=CFCF_2(CF_2)_yCF_3$, $CF_3CF=CFCF(OR)(CF_2)_x(CF_2)_yCF_3$, $CF_3(CF_2)_xCF=C(OR)CF_2(CF_2)_yCF_3$, and mixtures thereof; wherein x and y are independently 0, 1, 2, 3 or 4 and wherein x+y=0, 1, 2, 3 or 4; and wherein R is 2,2,3,3-tetrafluoro-1-propyl, 2,2,3,3,3-pentafluoro-1-propyl, 2,2,2-trifluoro-1-ethyl, 2,2,3,3,4,4,5,5-octafluoro-1-pentyl, or 1,1,1,3,3,3-hexafluoro-2-propyl;
c) mixtures of compounds from (a) and (b).

Embodiment A2

The composition of Embodiment A1, wherein the alkyl perfluoroalkene ethers comprise at least one of 5-methoxyperfluoro-3-heptene, 3-methoxyperfluoro-3-heptene, 4-methoxyperfluoro-2-heptene, 3-methoxyperfluoro-2-heptene, or mixtures thereof.

Embodiment A3

The composition of Embodiment A1, wherein the alkyl perfluoroalkene ethers comprise at least one of 4-methoxyperfluoro-2-pentene, 2-methoxyperfluoro-2-pentene, 3-methoxyperfluoro-2-pentene, 2-methoxyperfluoro-3-pentene, or mixtures thereof.

Embodiment A4

The composition of Embodiment A1, wherein the alkyl perfluoroalkene ethers comprise at least one of cis- and trans-2-methoxyperfluoro-2-octene, 2-methoxyperfluoro-3-octene, or mixtures thereof.

Embodiment A5

The composition of any of Embodiments A1-A4, wherein the working fluid further comprises at least one compound selected from hydrofluorocarbons, hydrochlorocarbons, hydrofluoroethers, hydrofluoroolefins, hydrochlorofluoroolefins, siloxanes, hydrocarbons, alcohols, perfluoropolyethers, and mixtures thereof.

Embodiment A6

The composition of any of Embodiments A1-A5, wherein the working fluid comprises azeotropic or near-azeotropic mixtures.

Embodiment A7

The composition of any of Embodiments A1-A5, wherein the azeotropic or near azeotropic mixture comprises at least one methyl perfluoroheptene ether and at least one compound selected from the group consisting of heptane, ethanol, and trans-1,2-dichloroethene.

Embodiment A8

The composition of any of Embodiments A1-A5, wherein the azeotropic or near azeotropic mixture comprises at least one methyl perfluoropentene ether and at least one compound selected from the group consisting of trans-1,2-dichloroethene, methanol, ethanol, 2-propanol, heptane, hexane, cyclopentane, ethyl formate, methyl formate, $C_4F_9OCH_3$, $C_4F_9OC_2H_5$, HFC-365mfc, and 1-bromopropane.

Embodiment B1

A method for producing heating in a high temperature heat pump having a heat exchanger comprising extracting heat from a working fluid, thereby producing a cooled working fluid wherein said working fluid comprises A composition of any of Embodiments A1-A8.

Embodiment B2

The method of Embodiment B1, wherein the heat exchanger is selected from the group consisting of a supercritical working fluid cooler and a condenser.

Embodiment B3

The method of any of Embodiments B1 or B2, wherein the heat exchanger operates at a temperature of at least 55° C.

Embodiment B4

The method of any of Embodiments B1 or B2, wherein the heat exchanger operates at a temperature of at least 150° C.

Embodiment B5

The method of Embodiment B1, further comprising passing a first heat transfer medium through the heat exchanger, whereby said extraction of heat heats the first heat transfer medium, and passing the heated first heat transfer medium from the heat exchanger to a body to be heated.

Embodiment B6

The method of Embodiment B5, wherein the first heat transfer medium is an industrial heat transfer liquid and the body to be heated is a chemical process stream.

Embodiment B7

The method of any of Embodiments B1-B6, further comprising expanding the working fluid and then heating the working fluid in a second heat exchanger to produce a heated working fluid.

Embodiment B8

The method of Embodiment B7, wherein said second heat exchanger is an evaporator and the heated working fluid is a vapor.

Embodiment B9

The method of any of Embodiments B1-B7, further comprising compressing the working fluid vapor in a dynamic (e.g. axial or centrifugal) or a positive displacement (e.g. reciprocating, screw or scroll) compressor.

Embodiment B10

The method of Embodiment B9, wherein the dynamic compressor is a centrifugal compressor.

Embodiment B11

The method of any of Embodiments B1-B10, further comprising passing a fluid to be heated through said condenser, thus heating the fluid.

Embodiment C1

A method for producing heating in a high temperature heat pump wherein heat is exchanged between at least two stages arranged in a cascade configuration, comprising absorbing heat at a selected lower temperature in a first working fluid in a first cascade stage and transferring this heat to a second working fluid of a second cascade stage that supplies heat at a higher temperature; wherein the second working fluid comprises the composition of any of Embodiments A1-A8.

Embodiment D1

A method of raising the condenser operating temperature in a high temperature heat pump apparatus comprising charging the high temperature heat pump with a working fluid comprising the composition of any of Embodiments A1-A8.

Embodiment D2

The method of Embodiment D1, wherein the condenser operating temperature is raised to a temperature greater than about 150° C.

Embodiment E1

A high temperature heat pump apparatus containing a working fluid comprising the composition of any of Embodiments A1-A8.

Embodiment E2

The high temperature heat pump apparatus of Embodiment E1 wherein said apparatus comprises an evaporator, a compressor, a condenser or a supercritical working fluid cooler, and an expansion device.

Embodiment E3

The high temperature heat pump apparatus of any of Embodiments E1-E2, wherein the condenser or supercritical working fluid cooler operates at a temperature of at least 55° C.

Embodiment E4

The high temperature heat pump apparatus of any of Embodiments E1-E3 comprising a dynamic or a positive displacement compressor.

Embodiment E5

The high temperature heat pump apparatus of any of Embodiments E1-E4 comprising a centrifugal compressor.

Embodiment E6

The high temperature heat pump apparatus of any of Embodiments E1-E4 comprising a screw compressor.

Embodiment E7

The high temperature heat pump apparatus of any of Embodiments E1-E6, said apparatus comprising (a) a first heat exchanger through which a working fluid flows and is heated; (b) a compressor in fluid communication with the first heat exchanger that compresses the heated working fluid to a higher pressure; (c) a second heat exchanger in fluid communication with the compressor through which the high pressure working fluid flows and is cooled; and (d) a pressure reduction device in fluid communication with the second heat exchanger wherein the pressure of the cooled working fluid is reduced and said pressure reduction device further being in fluid communication with the evaporator such that the working fluid then repeats flow through components (a), (b), (c) and (d) in a repeating cycle.

Embodiment E8

The high temperature heat pump apparatus of any of Embodiments E1-E7 having at least two heating stages arranged as a cascade heating system, each stage circulating a working fluid therethrough, wherein heat is transferred to the final or highest-temperature stage from the preceding stage and wherein the heating fluid of the final stage comprises at least one alkyl perfluoroalkene ether.

Embodiment E9

The high temperature heat pump apparatus of any of Embodiments E1-E8 having at least two heating stages, a first or lower-temperature stage and a second or higher-temperature stage, arranged as a cascade heating system, each stage circulating a working fluid therethrough comprising (a) a first expansion device for reducing the pressure and temperature of a first working fluid liquid; (b) an evaporator in fluid communication with the first expansion device having an inlet and an outlet; (c) a first compressor in fluid communication with the evaporator and having an inlet and an outlet; (d) a cascade heat exchanger system in fluid communication with the first compressor outlet having (i) a first inlet and a first outlet, and (ii) a second inlet and a second outlet in thermal communication with the first inlet and outlet; (e) a second compressor in fluid communication with the second outlet of the cascade heat exchanger system and having an inlet and an outlet; (f) a condenser in fluid communication with the second compressor and having an inlet and an outlet; and (g) a second expansion device in fluid communication with the condenser; wherein the second working fluid comprises at least one alkyl perfluoroalkene ether.

Embodiment E10

The high temperature heat pump apparatus of any of Embodiments E8-E9, wherein the first or lower-temperature stage working fluid comprises at least one fluoroolefin or chlorofluoroolefin selected from the group consisting of HFO-1234yf, E-HFO-1234ze, E-HFO-1234ye-E or Z, HFO-1243zf, HFO-1234ze-Z, HFO-1336mzz-E, HFO-1336mzz-Z, HFO-1438mzz-E, HFO-1438ezy-E, HFO-1438ezy-Z, HFO-1336yf, HFO-1336ze-E, HCFO-1233zd-E, HCFO-1233zd-Z, and HCFO-1233xf.

Embodiment E11

The high temperature heat pump apparatus of any of Embodiments E8-E10, wherein the first or lower-temperature stage working fluid comprises at least one fluoroalkane selected from the group consisting of HFC-161, HFC-32, HFC-125, HFC-245cb, HFC-134a, HFC-134, HFC-143a, HFC-152a, HFC-161, HFC-227ea, HFC-236ea, HFC-245fa, HFC-245eb, HFC-365mfc, and HFC-4310mee.

Embodiment E12

The high temperature heat pump apparatus of any of Embodiments E8-E11, wherein the working fluid of the stage preceding the final or highest-temperature stage comprises at least one fluoroolefin or chlorofluoroolefin selected from the group consisting of HFO-1234yf, E-HFO-1234ze, E-HFO-1234ye-E or Z, HFO-1243zf, HFO-1234ze-Z, HFO-1336mzz-E, HFO-1336mzz-Z, HFO-1438mzz-E, HFO-1438mzz-Z, HFO-1438ezy-E, HFO-1438ezy-Z, HFO-1336yf, HFO-1336ze-E, HFO-1336ze-Z, HCFO-1233zd-E, HCFO-1233zd-Z, and HCFO-1233xf.

Embodiment E13

The high temperature heat pump apparatus of any of Embodiments E8-E12, wherein the working fluid of the stage preceding the final or highest-temperature stage comprises at least one fluoroalkane selected from the group consisting of HFC-161, HFC-32, HFC-125, HFC-245cb, HFC-134a, HFC-134, HFC-143a, HFC-152a, HFC-161, HFC-227ea, HFC-236ea, HFC-245fa, HFC-245eb, HFC-365mfc, and HFC-4310mee.

Embodiment E14

The heat pump apparatus of any of Embodiments E8-E13, wherein the first or lowest-temperature stage working fluid comprises at least one working fluid selected from $CO_2$ or $N_2O$.

Embodiment F1

A method for supplying simultaneous heating and cooling in a cascade heat pump system comprising providing a low temperature cascade stage containing a working fluid selected from the group consisting of $CO_2$, $N_2O$, HFC-161, HFC-32, HFC-125, HFC-143a, HFC-245cb, HFC-134a, HFC-134, HFC-152a and HFC-227ea, HFC-236ea, HFC-245fa, HFC-245eb, HFC-365mfc, HFC-4310mee, HFO-1234yf, HFO-1234ze-E, HFO-1243zf, HFO-1234ze-Z, HFO-1336mzz-E, HFO-1234ye-E or Z (1,2,3,3-tetrafluoropropene, E- or Z-isomer), HFO-1336mzz-Z, HFO-1438mzz-E, HFO-1438mzz-Z, HFO-1438ezy-E, HFO-1438ezy-Z, HFO-1336yf, HFO-1336ze-E, HFO-1336ze-Z, HCFO-1233zd-E, HCFO-1233zd-Z, HCFO-1233xf, 5-methoxyperfluoro-3-heptene, 3-methoxyperfluoro-3-heptene, 4-methoxyperfluoro-2-heptene, 3-methoxyperfluoro-2-heptene, 4-methoxyperfluoro-2-pentene, 2-methoxyperfluoro-2-pentene, 3-methoxyperfluoro-2-pentene, 2-methoxyperfluoro-3-pentene, cis- and trans-2-methoxyperfluoro-2-octene, 2-methoxyperfluoro-3-octene and mixtures thereof; and providing a high temperature cascade stage containing a working fluid comprising at least one alkyl perfluoroalkene ether; wherein said low temperature cascade stage and said high temperature cascade stage are in thermal contact.

Embodiment G1

A composition for use in high temperature heat pumps comprising (i) a working fluid consisting essentially of the composition of any of Embodiments A1-A8; and (ii) a stabilizer to prevent degradation at temperatures of 55° C. or above; or (iii) a lubricant suitable for use at 55° C. or above, or both (ii) and (iii).

What is claimed is:
1. A method for producing heating in a high temperature heat pump having a heat exchanger comprising extracting heat from a working fluid, thereby producing a cooled working fluid wherein said working fluid comprises at least one alkyl perfluoroalkene ether, wherein the heat exchanger operates at a temperature greater than about 150° C.

2. The method of claim 1 wherein the heat exchanger is selected from the group consisting of a supercritical working fluid cooler and a condenser.

3. The method of claim 1 further comprising passing a first heat transfer medium through the heat exchanger, whereby said extraction of heat heats the first heat transfer medium, and passing the heated first heat transfer medium from the heat exchanger to a body to be heated.

4. The method of claim 3, wherein the first heat transfer medium is an industrial heat transfer liquid and the body to be heated is a chemical process stream.

5. The method of claim 3, further comprising compressing the working fluid vapor in a dynamic or a positive displacement compressor.

6. The method of claim 5, wherein the dynamic compressor is a centrifugal compressor.

7. The method of claim 1 further comprising expanding the working fluid and then heating the working fluid in a second heat exchanger to produce a heated working fluid.

8. The method of claim 7 wherein said second heat exchanger is an evaporator and the heated working fluid is a vapor.

9. The method of claim 1 further comprising passing a fluid to be heated through said condenser, thus heating the fluid.

10. The method of claim 1, wherein said working fluid comprises at least one alkyl perfluoroalkene ether selected from the group consisting of:
  a) compounds of formula $CF_3(CF_2)_xCF\!=\!CFCF(OR)(CF_2)_yCF_3$, $CF_3(CF_2)_xC(OR)\!=\!CFCF_2(CF_2)_yCF_3$, $CF_3CF\!=\!CFCF(OR)(CF_2)_x(CF_2)_yCF_3$, $CF_3(CF_2)_xCF\!=\!C(OR)CF_2(CF_2)_yCF_3$, or mixtures thereof, wherein R can be either $CH_3$, $C_2H_5$ or mixtures thereof, wherein x and y are independently 0, 1, 2 or 3, and wherein x+y=0, 1, 2, or 3;
  b) compounds of formulas $CF_3(CF_2)_xCF\!=\!CFCF(OR)(CF_2)_yCF_3$, $CF_3(CF_2)_xC(OR)\!=\!CFCF_2(CF_2)_yCF_3$, $CF_3CF\!=\!CFCF(OR)(CF_2)_x(CF_2)_yCF_3$, $CF_3(CF_2)_xCF\!=\!C(OR)CF_2(CF_2)_yCF_3$, and mixtures thereof; wherein x and y are independently 0, 1, 2, 3, or 4 and wherein x+y=0, 1, 2, 3, or 4; and wherein R is 2,2,3,3-tetrafluoro-1-propyl, 2,2,3,3,3-pentafluoro-1-propyl, 2,2,2-trifluoro-1-ethyl, 2,2,3,3,4,4,5,5-octafluoro-1-pentyl, or 1,1,1,3,3,3-hexafluoro-2-propyl; and
  c) mixtures of compounds from (a) and (b).

11. The method of claim 10, wherein the working fluid further comprises at least one compound selected from a hydrofluorocarbon, a hydrochlorocarbon, a hydrofluoroether, a hydrofluoroolefin, a hydrochlorofluoroolefin, a siloxane, a hydrocarbon, an alcohol, and a perfluoropolyether, or mixtures thereof.

12. The method or of claim 11, wherein the working fluid comprises an azeotropic or near-azeotropic mixture.

13. The method of claim 12, wherein the azeotropic or near azeotropic mixture comprises at least one methyl perfluoroheptene ether and at least one compound selected from the group consisting of heptane, ethanol, and trans-1,2-dichloroethene.

14. The method of claim 12, wherein the azeotropic or near azeotropic mixture comprises at least one methyl perfluoropentene ether and at least one compound selected from the group consisting of trans-1,2-dichloroethene, methanol, ethanol, 2-propanol, heptane, hexane, cyclopentane, ethyl formate, methyl formate, $C_4F_9OCH_3$, $C_4F_9OC_2H_5$, HFC-365mfc, and 1-bromopropane.

15. The method of claim 1, wherein the working fluid comprises at least one alkyl perfluoroalkene ether selected from the group consisting of cis-2-methoxyperfluoro-2-octene, trans-2-methoxyperfluoro-2-octene, and 2-methoxyperfluoro-3-octene, or a mixture thereof.

16. The method of claim 1, wherein the working fluid comprises at least one alkyl perfluoroalkene ether selected from the group consisting of 5-methoxyperfluoro-3-heptene, 3-methoxyperfluoro-3-heptene, 4-methoxyperfluoro-2-heptene, and 3-methoxyperfluoro-2-heptene, or mixtures thereof.

17. The method of claim 1, wherein the working fluid comprises at least one alkyl perfluoroalkene ether selected from the group consisting of 4 methoxyperfluoro-2-pentene, 2-methoxyperfluoro-2-pentene, 3-methoxyperfluoro-2-pentene, and 2-methoxyperfluoro-3-pentene, or mixtures thereof.

* * * * *